US012437560B2

(12) United States Patent
Wang

(10) Patent No.: US 12,437,560 B2
(45) Date of Patent: Oct. 7, 2025

(54) VEHICLE DRIVING DETECTION METHOD AND APPARATUS, VEHICLE DRIVING WARNING METHOD AND APPARATUS, ELECTRONIC DEVICE, AND STORAGE MEDIUM

(71) Applicant: TENCENT TECHNOLOGY (SHENZHEN) COMPANY LIMITED, Shenzhen (CN)

(72) Inventor: Jian Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 285 days.

(21) Appl. No.: 18/077,687

(22) Filed: Dec. 8, 2022

(65) Prior Publication Data

US 2023/0103687 A1   Apr. 6, 2023

Related U.S. Application Data

(63) Continuation of application No. PCT/CN2022/083576, filed on Mar. 29, 2022.

(30) Foreign Application Priority Data

Apr. 29, 2021   (CN) .......................... 202110470434.8

(51) Int. Cl.
G06V 20/56       (2022.01)
B60W 40/105    (2012.01)
G06V 20/58       (2022.01)

(52) U.S. Cl.
CPC ......... G06V 20/588 (2022.01); B60W 40/105 (2013.01); G06V 20/58 (2022.01);
(Continued)

(58) Field of Classification Search
CPC ...... G06V 20/588; G06V 20/58; G06V 20/56; B60W 40/105; B60W 2554/4041;
(Continued)

(56) References Cited

U.S. PATENT DOCUMENTS 10,475,338 B1   11/2019 Noel
2009/0282072 A1   11/2009 Nagase et al.
(Continued)

FOREIGN PATENT DOCUMENTS

CN   201698589 U   1/2011
CN   104584099 A   4/2015
(Continued)

OTHER PUBLICATIONS

China National Intellectual Property Administration (CNIPA) Office Action 1 for 202110470434.8 Jun. 8, 2021 16 Pages (including translation).
(Continued)

Primary Examiner — Siamak Harandi
(74) Attorney, Agent, or Firm — ANOVA LAW GROUP, PLLC

(57) ABSTRACT

A vehicle driving detection method includes: obtaining first image data corresponding to a driving direction of a first vehicle; performing lane line detection processing on the first image data to determine that the first vehicle is traveling along a first lane of at least two lanes; performing image recognition processing on the first image data to detect that a second vehicle travels on the first lane within a preset distance in front of the first vehicle; performing speed measurement processing on the second vehicle to obtain a first speed of the second vehicle; and determining, when the first speed is less than a minimum speed limit of the first lane, the second vehicle as a potential slow vehicle.

16 Claims, 15 Drawing Sheets

(52) U.S. Cl.
CPC . *B60W 2554/4041* (2020.02); *B60W 2555/60* (2020.02); *B60W 2756/10* (2020.02)

(58) Field of Classification Search
CPC .......... B60W 2555/60; B60W 2756/10; G08G 1/017; G08G 1/052; G08G 1/167
See application file for complete search history.

(56) References Cited

U.S. PATENT DOCUMENTS

| | | | |
|---|---|---|---|
| 2016/0325750 | A1 | 11/2016 | Kanda et al. |
| 2017/0294117 | A1 | 10/2017 | Burke et al. |
| 2018/0148061 | A1 | 5/2018 | Reckziegel et al. |
| 2019/0035276 | A1 | 1/2019 | Zruya et al. |
| 2019/0304302 | A1 | 10/2019 | Knauer |
| 2020/0105135 | A1* | 4/2020 | Noel ................ G06V 20/588 |
| 2021/0072744 | A1* | 3/2021 | Urano ............... B60W 60/0027 |
| 2021/0150888 | A1* | 5/2021 | Vanderkam ........ G08G 1/0133 |

FOREIGN PATENT DOCUMENTS

| | | | |
|---|---|---|---|
| CN | 105825185 | A | 8/2016 |
| CN | 106114217 | A | 11/2016 |
| CN | 106297350 | A | 1/2017 |
| CN | 108122432 | A | 6/2018 |
| CN | 108877234 | A | 11/2018 |
| CN | 108883725 | A | 11/2018 |
| CN | 209028836 | U | 6/2019 |
| CN | 110782680 | A | 2/2020 |
| CN | 112071117 | A | 12/2020 |
| CN | 112540384 | A | 3/2021 |
| CN | 112885112 | A | 6/2021 |
| KR | 102187021 | B1 | 12/2020 |

OTHER PUBLICATIONS

The World Intellectual Property Organization (WIPO) International Search Report for PCT/CN2022/083576 May 30, 2022 8 Pages (including translation).
User7623498., "Algorithm Collection (18) | Autonomous Driving | Lane Line Detection Algorithm", Aug. 4, 2020, https://cloud.tencent.com/developer/article/1673568.
"OCR-Vehicle Plate Number Recognition", Jul. 28, 2021, https://cloud.tencent.com/document/product/866/17601.
"H3: A Hexagonal Hierarchical Geospatial Indexing System", https://h3geo.org/#/, Accessed on Dec. 15, 2022.

* cited by examiner

| H3 accuracy | Grid size (KM2) | Grid size (M2) | Grid side length (KM) | Grid side length (M) | Grid quantity |
|---|---|---|---|---|---|
| 0 | 4250546.848 | 4.25055E+12 | 1107.712591 | 1107712.591 | 122L |
| 1 | 607220.9782 | 6.07221E+11 | 418.6760056 | 418676.0056 | 842L |
| 2 | 86745.85403 | 86745854035 | 158.2446558 | 158244.6558 | 5882L |
| 3 | 12392.26486 | 12392264862 | 59.81085794 | 59810.85794 | 41162L |
| 4 | 1770.323552 | 1770323552 | 22.6063794 | 22606.3794 | 288122L |
| 5 | 252.9033645 | 252903364.5 | 8.544408276 | 8544.408276 | 2016842L |
| 6 | 36.1290521 | 36129052.1 | 3.229482772 | 3229.482772 | 14117882L |
| 7 | 5.1612932 | 5161293.2 | 1.220629759 | 1220.629759 | 98825162L |
| 8 | 0.7373276 | 737327.6 | 0.461354684 | 461.3546837 | 691776122L |
| 9 | 0.1053325 | 105332.5 | 0.174375668 | 174.3756681 | 4842432842L |
| 10 | 0.0150475 | 15047.5 | 0.065907607 | 65.90780749 | 33897029862L |
| 11 | 0.0021496 | 2149.6 | 0.024910561 | 24.9105614 | 237279209162L |
| 12 | 0.0003071 | 307.1 | 0.009415526 | 9.415526211 | 1660954464122L |
| 13 | 0.0000439 | 43.9 | 0.003559893 | 3.559893033 | 11626681248842L |

FIG. 3

VEHICLE DRIVING DETECTION METHOD AND APPARATUS, VEHICLE DRIVING WARNING METHOD AND APPARATUS, ELECTRONIC DEVICE, AND STORAGE MEDIUM

CROSS-REFERENCES TO RELATED APPLICATIONS

This application is a continuation application of PCT Patent Application No. PCT/CN2022/083576, filed on Mar. 29, 2022, which claims priority to Chinese Patent Application No. 202110470434.8, entitled "VEHICLE DRIVING DETECTION METHOD AND APPARATUS, VEHICLE DRIVING WARNING METHOD AND APPARATUS, ELECTRONIC DEVICE, AND STORAGE MEDIUM" filed on Apr. 29, 2021, the entire contents of both of which are incorporated herein by reference.

FIELD OF THE TECHNOLOGY

Embodiments of the present disclosure relate to the field of intelligent transportation, and more specifically, to a vehicle driving detection method and apparatus, a vehicle driving warning method and apparatus, an electronic device, and a storage medium.

BACKGROUND OF THE DISCLOSURE

With the construction of traffic network, driving plays an increasingly important role in people's travel, which greatly enriches users' travel experience. However, some slow vehicles on a fast lane not only affect driving experience of surrounding vehicles, but also result in traffic chaos or traffic accidents. Therefore, how to identify the slow vehicles for warning is an urgent technical problem to be solved.

SUMMARY

The present disclosure provides a vehicle driving detection method and apparatus, a vehicle driving warning method and apparatus, an electronic device, a chip, and a computer-readable storage medium. A user vehicle can recognize a slow vehicle on a same lane ahead and give warning, so that the slow vehicle can leave the lane or speed up in an original lane, thus avoiding an influence of the slow vehicle on a vehicle behind and improving driving experience.

Other features and advantages of the present disclosure become obvious through the following detailed descriptions, or may be partially learned partially through the practice of the present disclosure.

According to an aspect of the present disclosure, a vehicle driving detection method is provided, and performed by an electronic device. The method includes: obtaining first image data corresponding to a driving direction of a first vehicle; performing lane line detection processing on the first image data to determine that the first vehicle is traveling along a first lane of at least two lanes; performing image recognition processing on the first image data to detect that a second vehicle travels on the first lane within a preset distance in front of the first vehicle; performing speed measurement processing on the second vehicle to obtain a first speed of the second vehicle; and, determining, when the first speed is less than a minimum speed limit of the first lane, the second vehicle as a potential slow vehicle.

According to an aspect of the present disclosure, a vehicle driving warning method is provided, and performed by an electronic device. The method includes: receiving slow vehicle warning information transmitted by a first vehicle, the slow vehicle warning information including at least position information of a second vehicle and license plate information of the second vehicle; backtracking a historical congestion event according to the slow vehicle warning information, to determine whether the second vehicle is a frontmost slow vehicle traveling on a same lane as the first vehicle within the preset distance in front of the first vehicle; and transmitting slow speed indication information to the second vehicle when the second vehicle is the frontmost slow vehicle traveling on the same lane as the first vehicle within the preset distance in front of the first vehicle, the slow speed indication information being used for instructing the second vehicle to travel into a slow lane or speed up in an original lane.

According to an aspect of the present disclosure, a vehicle driving detection apparatus is provided. The apparatus includes: an obtaining module, configured to obtain first image data corresponding to a driving direction of a first vehicle; and a processing module, configured to perform lane line detection processing on the first image data to determine that the first vehicle is traveling along a first lane of at least two lanes, perform image recognition processing on the first image data to detect that a second vehicle travels on the first lane within a preset distance in front of the first vehicle, perform speed measurement processing on the second vehicle to obtain a first speed of the second vehicle, and determine, when the first speed is less than a minimum speed limit of the first lane, the second vehicle as a potential slow vehicle.

According to an aspect of the present disclosure, a vehicle driving warning apparatus is provided. The apparatus includes: a receiving module, configured to receive slow vehicle warning information transmitted by a first vehicle, the slow vehicle warning information including at least position information of a second vehicle and license plate information of the second vehicle; a processing module, configured to backtrack a historical congestion event according to the slow vehicle warning information, to determine whether the second vehicle is a frontmost slow vehicle traveling on a same lane as the first vehicle within the preset distance in front of the first vehicle; and a transmission module, configured to transmit slow speed indication information to the second vehicle when the second vehicle is the frontmost slow vehicle traveling on the same lane as the first vehicle within the preset distance in front of the first vehicle, the slow speed indication information being used for instructing the second vehicle to travel into a slow lane or speed up in an original lane.

According to an aspect of the present disclosure, an electronic device is provided. The electronic device includes: a processor and a memory, the memory being configured to store a computer program, and the processor being configured to invoke and run the computer program stored in the memory, to perform steps in the foregoing vehicle driving detection method, or steps in the foregoing vehicle driving warning method.

According to an aspect of the present disclosure, a chip is provided. The chip includes: a processor, configured to invoke and run a computer program from a memory, causing the processor to perform steps in the foregoing vehicle driving detection method, or steps in the foregoing vehicle driving warning method.

According to an aspect of the present disclosure, a non-transitory computer-readable storage medium is provided, configured to store a computer program, the computer program, causing a computer to perform steps in the foregoing vehicle driving detection method, or steps in the foregoing vehicle driving warning method.

Other features and advantages of the embodiments of the present disclosure will become apparent through the following detailed description, or partially acquired through practices of the present disclosure.

It is to be understood that the above general descriptions and the following detailed descriptions are merely exemplary, and do not limit the present disclosure.

BRIEF DESCRIPTION OF THE DRAWINGS

Accompanying drawings herein are incorporated into a specification and constitute a part of this specification, show embodiments that conform to the present disclosure, and are used for describing a principle of the present disclosure together with this specification. Apparently, the accompanying drawings described below are merely some embodiments of the present disclosure, and a person of ordinary skill in the art may further obtain other accompanying drawings according to the accompanying drawings without creative efforts.

FIG. 3 is a schematic diagram of an H3 grid parameter according to the present disclosure.

DESCRIPTION OF EMBODIMENTS

Figure 1:
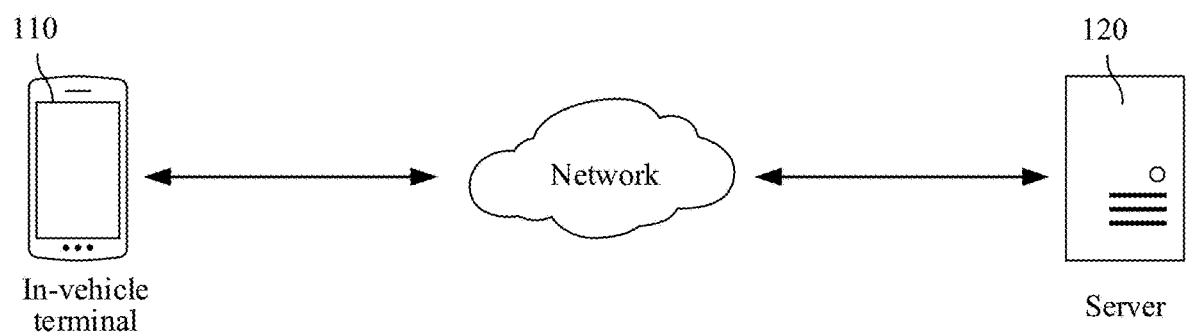
FIG. 1 is a schematic diagram of an application scenario of a vehicle driving detection method and a vehicle driving warning method according to an embodiment of the present disclosure.

Exemplary implementations are now described more comprehensively with reference to the accompanying drawings. However, the examples of implementations may be implemented in a plurality of forms, and it is not to be understood as being limited to the examples of implementations described herein. Conversely, the exemplary implementations are provided to make descriptions of the present disclosure more comprehensive and complete, and comprehensively convey the idea of the examples of the implementations to a person skilled in the art. The accompanying drawings are exemplary illustrations of the present disclosure and are not necessarily drawn to scale. The same reference numeral in the accompanying drawings represents same or similar components, and therefore repeated descriptions of the components are appropriately omitted.

In addition, the described features, structures, or characteristics may be combined in one or more exemplary implementations in any appropriate manner. In the following description, many specific details are provided to give a full understanding of the exemplary implementations of the present disclosure. However, a person skilled in the art is to be aware that, the technical solutions in the present disclosure may be implemented without one or more of particular details, or another method, component, step, and the like may be used. In other cases, well-known structures, methods, implementations, or operations are not shown or described in detail to avoid obscuring aspects of the present disclosure.

Some of the block diagrams shown in the accompanying drawings are functional entities and do not necessarily correspond to physically or logically independent entities. Such functional entities may be implemented by using software, or implemented in one or more hardware modules or integrated circuits, or implemented in different networks, processor apparatuses, or micro-control apparatuses.

An intelligent traffic system (ITS) is also referred to as an intelligent transportation system, and effectively and comprehensively applies an advanced technology (such as an information technology, a computer technology, a data communication technology, a sensor technology, an electronic control technology, an automatic control theory, an operations research, and an artificial intelligence (AI)) to transportation, service control, and vehicle manufacturing, so as to strengthen a connection between a vehicle, a road, and a user, thereby forming an integrated transportation system for safety assurance, efficiency improvement, environmental enhancement, and energy saving.

An intelligent vehicle infrastructure cooperative system (IVICS), referred to as a vehicle infrastructure cooperative system, is a development direction of the intelligent traffic system (ITS). The vehicle infrastructure cooperative system uses advanced wireless communication and new-generation Internet technologies to comprehensively implement dynamic real-time information interaction of vehicle-to-vehicle and vehicle-to-road, and perform active vehicle safety control and road collaboration management based on acquisition and integration of full-time and full-space dynamic traffic information, thus fully realizing effective collaboration of people, vehicles and roads, ensuring traffic safety and improving traffic efficiency, thereby forming a safe, efficient, and environmentally friendly road traffic system.

FIG. 1 is a diagram of an application scenario of a vehicle driving detection method and a vehicle driving warning method according to an embodiment. As shown in FIG. 1, an in-vehicle terminal 110 and a server 120 are included in the application scenario. The in-vehicle terminal 110 may be a computing device resided in or coupled to a vehicle (e.g., wired or wirelessly) and includes a camera and has certain storage, processing, and transceiving capabilities. The server 120 may be, for example, a server of a traffic system, or some road monitoring device, and has certain storage, processing, and transceiving capabilities. The server 120 may implement management and control for a vehicle.

In some implementations, the in-vehicle terminal 110 may obtain image data corresponding to a driving direction from the camera; perform lane line detection processing on the image data corresponding to the driving direction to determine a lane on which the in-vehicle terminal 110 travels; and perform image recognition processing on the image data corresponding to the driving direction to detect whether there is a vehicle traveling within a preset distance in front of the in-vehicle terminal 110. The in-vehicle terminal 110 may measure a speed of a preceding vehicle to obtain the speed of the preceding vehicle. The in-vehicle terminal 110 may further report slow vehicle warning information to the server 120, which may specifically include at least one of current position information of a slow vehicle, license plate information of the slow vehicle, current speed information of the slow vehicle, and currently obtained image data corresponding to a driving direction of a user vehicle. The server 120 may instruct the slow vehicle to travel into a slow lane or speed up in an original lane. Here, image data corresponding to a driving direction of a vehicle may refer to image data describing a scene in a driving direction of the vehicle. The image data may be acquired by the vehicle or an image acquisition apparatus coupled to the vehicle. For example, a vehicle may use an onboard camera to capture image data of a scene in front of the vehicle, and the scene may include road that the vehicle is traveling on and one or more vehicles in front of the vehicle.

For example, image data is obtained based on a camera of user equipment. Based on the image data (an object recognition process, it is determined that a specific road feature is positively recognized from an image), it is determined that a user's vehicle is traveling along a left lane having at least two lanes. It is detected that another vehicle is traveling on the left lane of the road within a predetermined distance in front of the user's vehicle. Speeds of the user vehicle and a target vehicle are obtained. It is determined that the speed of the target vehicle is lower than a minimum speed limit of a road according to obtained speed information, and as a response, a potential violation program is triggered and reported to the server. The server notifies that a speed of a preceding vehicle is lower than a road speed limit and guides a driver of the preceding vehicle to enter a right lane.

It is to be understood that the foregoing application scenario is merely an example and does not limit the vehicle driving detection and warning solution provided in the embodiments of the present disclosure.

The server 120 may be an independent physical server, may also be a server cluster or distributed system composed of a plurality of physical servers, and may also be a cloud server providing basic cloud computing services, such as a cloud service, a cloud database, cloud computing, a cloud function, cloud storage, a network service, cloud communication, a middleware service, a domain name service, a security service, a CDN, and a big data and AI platform. The in-vehicle terminal 110 may be, but is not limited to, a smartphone, a tablet computer, a notebook computer, a desktop computer, a smart speaker, a smart voice interaction device, a smart home appliance, an in-vehicle device, a smart watch, or the like. The in-vehicle terminal 110 and the server 120 may be directly or indirectly connected through wired or wireless communication, and the present disclosure is not limited thereto.

For ease of better understanding of the embodiments of the present disclosure, terminologies related to the present disclosure are described below.

User application (APP): A mobile APP having a navigation function used by a user.

Navigation software development kit (SDK): A kit providing a navigation capability to an APP, and providing capabilities such as navigation, route planning, route drawing, and the like.

Map SDK: It provides a basemap capability of a map and map tile service.

Driving route planning: A technology of calculating an optimal driving route by specifying a starting point and an ending point, combining with various preferences such as real-time road condition, less charge, and skipping highway.

Figure 2:
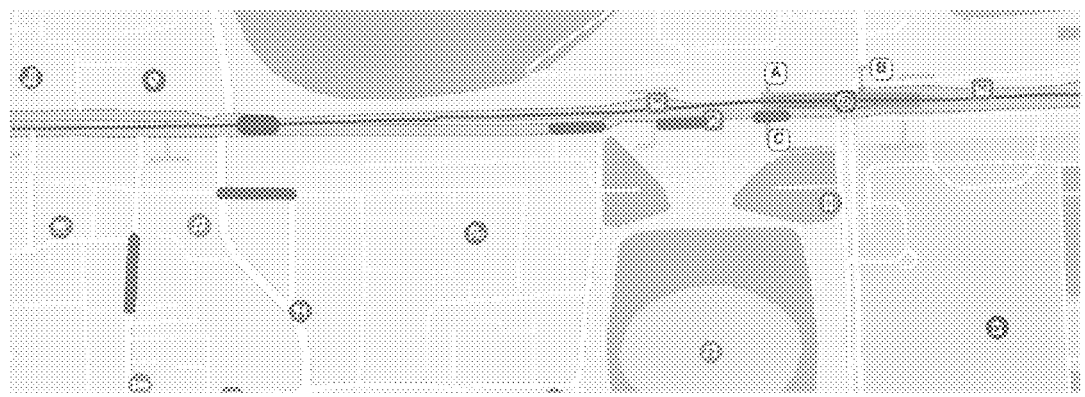
FIG. 2 is a schematic diagram of a link according to the present disclosure.

Link: In a map navigation service, roads are generally divided into links. The link is also a smallest unit of road network data provided by four-dimensional graphics. A length of the link is uncertain, and the link is truncated when encountering a door, an entrance and exit, an intersection, and the like. As shown in FIG. 2, bold lines are the links.

Link ID: A unique identifier of the link in the road network data.

Grid map system: An earth space is divided into recognizable grid cells by using a grid system. For example, uber H3 algorithm H3 is used for achieving hexagonal gridding of a map with approximate invisible change, and a longitude and latitude can be given to calculate a hexagonal grid identifier; or, a grid identifier and a surrounding query range are specified to query all grid identifiers within a certain range around. As shown in FIG. 3, a grid size of each precision of the H3 algorithm is given. For example, if a hexagonal grid whose H3 precision is 10 is selected to generate, a side length of each hexagon is 65.9 meters.

There are various versions of "slow driving rules" on a highway. In some scenarios, a leftmost lane on the highway is a high-speed lane. For example, the leftmost lane on the highway requires a speed of not less than 100 km/h, and the slow driving rule requires a vehicle to keep a speed limit of at least 100 km/h in the leftmost lane. In other scenarios, a rightmost lane on the highway is the high-speed lane. For example, the rightmost lane on the highway requires a speed of not less than 100 km/h, and the slow driving rule requires the vehicle to keep the speed limit of at least 100 km/h in the rightmost lane.

In the embodiments of the present disclosure, an example in which the leftmost lane on the highway is the high-speed lane is used for description.

A general principle behind these types of "slow driving rules" on the highway is that a vehicle travels relatively slower on a right side, and a vehicle travels relatively faster on a left side. For example, when a slow driver lingers on a left lane of a multi-lane road, a driver of a vehicle may tend to overtake to the right, resulting in traffic chaos, accidents, and traffic congestion. In addition, one of problems faced by a driver who violates a minimum speed limit of the left lane is that he is often unaware of traffic congestion or a potential accident caused by lingering in the left lane and the right lane.

Based on the foregoing technical problems, the present disclosure provides a vehicle driving detection and warning solution. By processing image data corresponding to a driving direction of a first vehicle, a whole detection solution is progressive, including:

First, it is detected whether a second vehicle in front of the first vehicle is a potential slow vehicle, that is, a current driving speed of the second vehicle is slow.

Then, after a preset duration, a speed of the slow vehicle is measured again. If it is detected that the second vehicle is still in a slow state, a slow vehicle warning is transmitted to the second vehicle, that is, the second vehicle continues to travel slowly.

Furthermore, after a historical congestion event is backtracked, it is determined that the second vehicle is a slow vehicle within a preset distance in front of the first vehicle and traveling in front of the same lane. Then, slow speed indication information is transmitted to the second vehicle. That is, the second vehicle is not only continuously traveling at a slow speed, but also a vehicle continuously traveling at a slow speed in the frontmost, so that the second vehicle leaves a fast lane or speeds up in an original lane, thus avoiding an influence of the slow vehicle on a vehicle behind and improving a driving experience of the vehicle behind. In addition, it also avoids traffic chaos and even a traffic accident caused by the slow vehicle.

A specific implementation process of the embodiments of the present disclosure is described below in detail.

Figure 4:
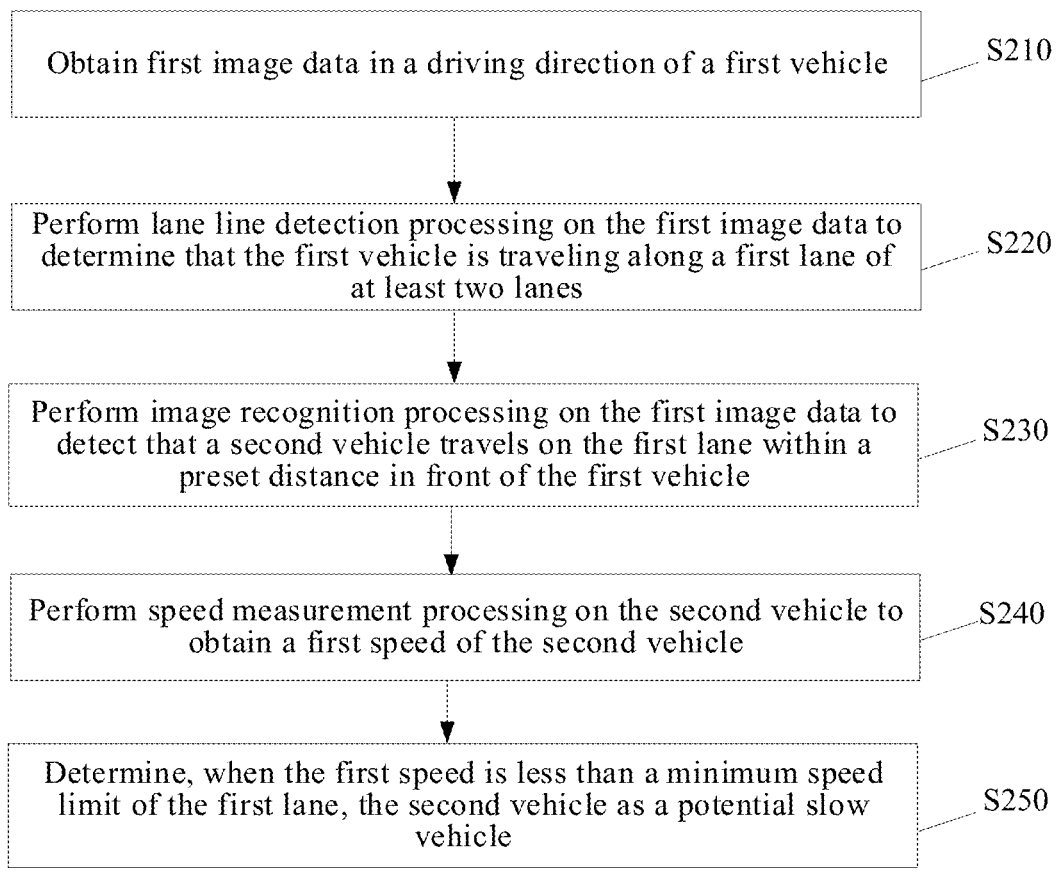
FIG. 4 is a schematic flowchart of a vehicle driving detection method according to an embodiment of the present disclosure.

FIG. 4 is a schematic flowchart of a vehicle driving detection method 200 according to an embodiment of the present disclosure. The vehicle driving detection method 200 may be performed by a device having a computational processing capability, for example, by the foregoing in-vehicle terminal 110, or jointly by the foregoing in-vehicle terminal 110 and the server 120. Referring to FIG. 4, the vehicle driving detection method 200 includes at least S210 to S250. A detailed description is as follows:

S210. Obtain first image data corresponding to a driving direction of a first vehicle.

Specifically, for example, the first image data corresponding to the driving direction of the first vehicle is obtained from a camera.

The camera may be a camera of an in-vehicle terminal of the first vehicle (such as a user's mobile phone or an in-vehicle driving recorder), or may also be a camera of another vehicle or device. This is not limited in the present disclosure.

For example, a user (such as a passenger) in the first vehicle obtains the first image data corresponding to the driving direction of the first vehicle through a camera of a mobile phone.

In another example, a camera of an in-vehicle driving recorder in the first vehicle automatically obtains the first image data corresponding to the driving direction of the first vehicle.

In some embodiments, the first image data is image data in a current driving direction of the first vehicle obtained from the camera, or the first image data is image data corresponding to the driving direction of the first vehicle within a period of time obtained from the camera, such as a plurality of continuously-shot pictures.

S220. Perform lane line detection processing on the first image data to determine that the first vehicle is traveling along a first lane of at least two lanes.

Figure 5:
FIG. 5 is a schematic diagram of a lane line detection according to an embodiment of the present disclosure.

Specifically, recognizing a lane on a road is a common task for all drivers, so as to ensure that a vehicle is within a lane restriction during driving and reduce a chance of collision with another vehicle due to crossing the lane. A specific road feature (that is, a total number of lanes, a driving lane, and the like) is recognized by performing the lane line detection processing on the first image data corresponding to the driving direction of the first vehicle as shown in FIG. 5. Certainly, the first image data corresponding to the driving direction of the first vehicle may be processed through another method to determine that the first vehicle is traveling along the first lane of at least two lanes. This is not limited in the embodiments of the present disclosure.

For example, the lane line detection processing is performed on the first image data corresponding to the driving direction of the first vehicle to determine that the first vehicle is driving along a leftmost lane of a road having three lanes.

In another example, the lane line detection processing is performed on the first image data corresponding to the driving direction of the first vehicle to determine that the first vehicle is driving along a middle lane of the road having three lanes.

S230. Perform image recognition processing on the first image data to detect that a second vehicle travels on the first lane within a preset distance in front of the first vehicle.

Specifically, the image recognition processing is performed on the first image data corresponding to the driving direction of the first vehicle to recognize license plate information of a preceding vehicle, and then to detect whether there is a vehicle traveling on the first lane within the preset distance in front of the first vehicle. For example, the image recognition processing can be performed on the first image data corresponding to the driving direction of the first vehicle through a deep learning model, to recognize license plate information of the preceding vehicle.

The preset distance can be flexibly set according to requirements, and this is not limited in the present disclosure.

A license plate is a unique identifier of a vehicle, and it can be determined that the vehicle travels on the first lane within the preset distance in front of the first vehicle through the license plate.

Figure 6:
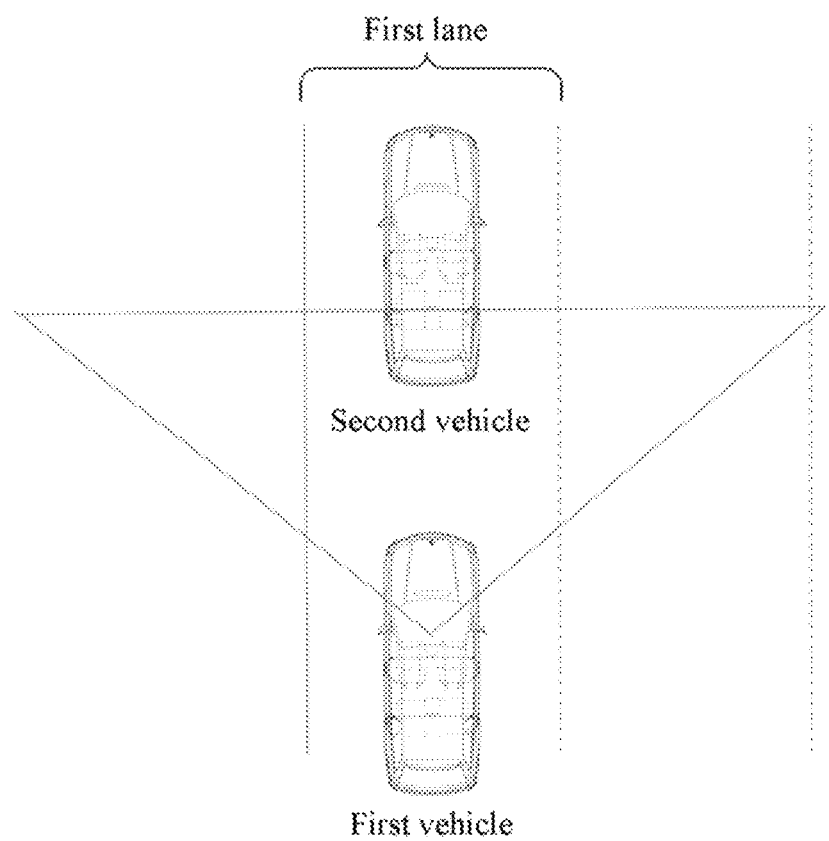
FIG. 6 is a schematic diagram of a first vehicle and a second vehicle according to an embodiment of the present disclosure.

Specifically, as shown in FIG. 6, the second vehicle travels on the same lane as the first vehicle within the preset distance ahead of the first vehicle.

S240. Perform speed measurement processing on the second vehicle to obtain a first speed of the second vehicle.

Specifically, speed information can be obtained through a sensing device (e.g., optical detection and ranging (laser radar (LIDAR)) device) connected to a vehicle. This can prevent a case that a user needs to transmit a plurality of positioning requests to a server, and then the speed information is calculated through distance/time, thereby reducing time of network interaction of the in-vehicle terminal and improving efficiency of a system.

S250. Determine, when the first speed is less than a minimum speed limit of the first lane, the second vehicle as a potential slow vehicle.

Specifically, a minimum speed limit of a road and/or lane can be obtained through road sign information, and a minimum speed limit of a road and/or lane at a current position can also be obtained by querying a map application or server.

The determined "potential slow vehicle" indicates that the second vehicle is currently in a slow driving state, and if it is still in the slow driving state in the future, a warning is triggered.

In some embodiments, the minimum speed limit of the first lane may be obtained from a road monitoring device or a map server according to current position information of the first vehicle.

In some embodiments, the road monitoring device may be the foregoing server 120 or a device capable of invoking resources of the foregoing server 120. The road monitoring device can implement management and control for a vehicle.

In some embodiments, slow vehicle warning information may also be directly transmitted to the road monitoring device when the first speed is less than the minimum speed limit of the first lane. This is not limited in the present disclosure.

Figure 7:
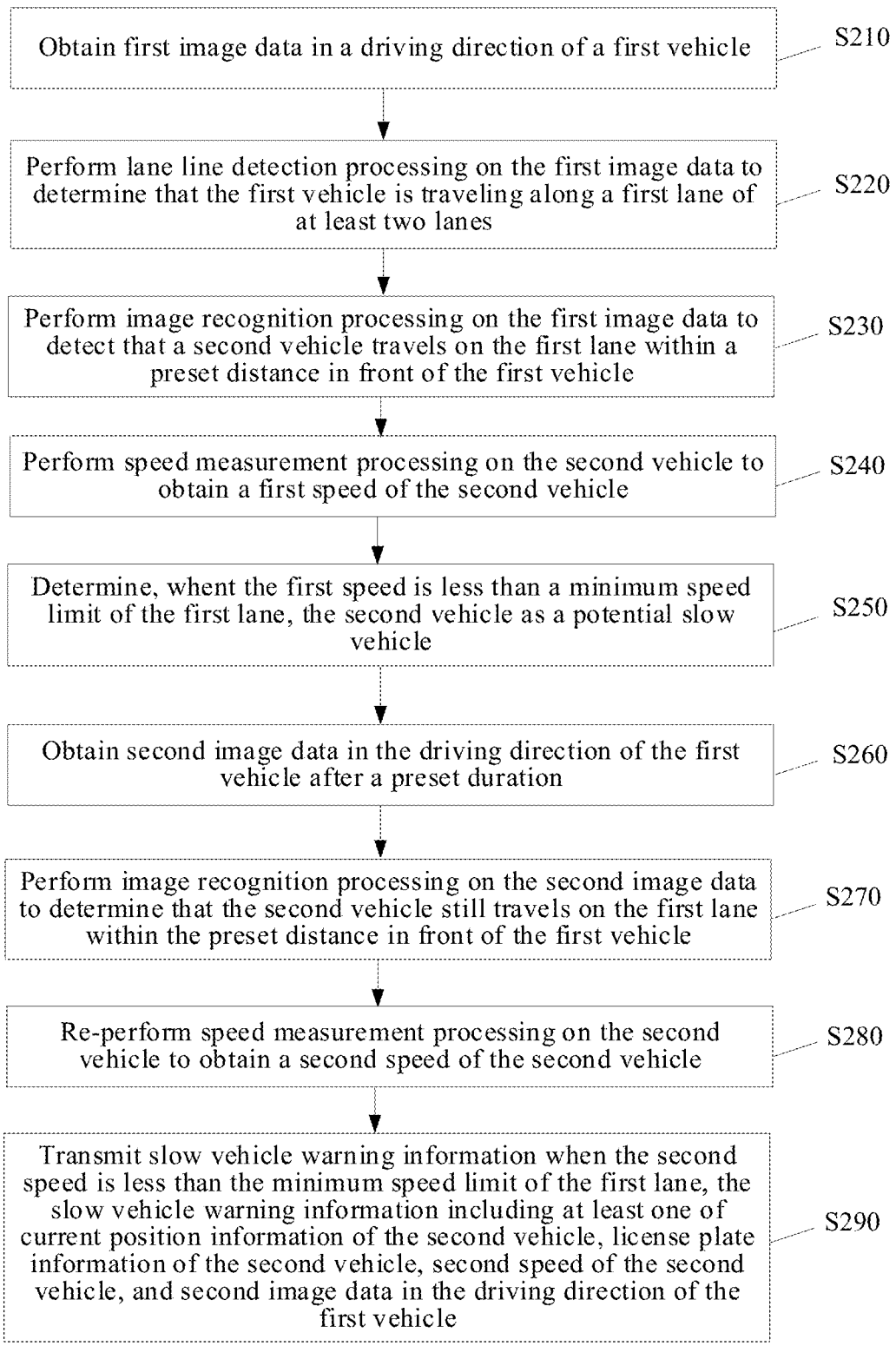
FIG. 7 is a schematic flowchart of a vehicle driving detection method according to another embodiment of the present disclosure.

FIG. 7 is a schematic flowchart of a vehicle driving detection method 200 according to an embodiment of the present disclosure. The vehicle driving detection method 200 may be performed by a device having a computational processing capability, for example, by the foregoing in-vehicle terminal 110, or jointly by the foregoing in-vehicle terminal 110 and the server 120. Referring to FIG. 7, on a basis of the foregoing S210 to S250, the vehicle driving detection method 200 includes at least S260 to S290. A detailed description is as follows:

S260. Obtain second image data corresponding to the driving direction of the first vehicle after a preset duration (e.g., a preset duration after obtaining the first image data).

Specifically, the preset duration may be flexibly set according to requirements, for example, the preset duration may be set to 10 s, 20 s, 30 s, 1 minute, and the like. This is not limited in the present disclosure.

In some embodiments, cameras that obtain image data corresponding to the driving direction of the first vehicle twice may be the same or different. This is not limited in the present disclosure.

S270. Perform image recognition processing on the second image data to determine that the second vehicle still travels on the first lane within the preset distance in front of the first vehicle.

Specifically, an image recognition method is the same as an image recognition method in the foregoing S230.

S280. Re-perform speed measurement processing on the second vehicle to obtain a second speed of the second vehicle.

Specifically, a speed measurement method is the same as a speed measurement method in the foregoing S240.

S290. Transmit slow vehicle warning information when the second speed is less than the minimum speed limit of the first lane, the slow vehicle warning information including at least one of current position information of the second vehicle (i.e., location of the second vehicle), license plate information of the second vehicle, second speed of the second vehicle, and second image data corresponding to the driving direction of the first vehicle.

That is, when the second speed is less than the minimum speed limit of the first lane, the first vehicle may determine that an average speed of the second vehicle within the preset duration is less than the minimum speed limit of the first lane, thereby determining that the second vehicle has been in the slow driving state, or determining that the second vehicle is in the slow driving state within the preset duration.

Specifically, when the second speed is less than the minimum speed limit of the first lane, the first vehicle may determine that the second vehicle is the slow vehicle. That is, traveling of the second vehicle may result in traffic chaos, and may further result in accidents and traffic congestion.

In some embodiments, a current position of the first vehicle may be reported as a current position of the second vehicle when position information of the second vehicle cannot be accurately obtained.

In some embodiments, the second vehicle is a frontmost vehicle among a plurality of vehicles traveling on the first lane, the frontmost vehicle does not have a vehicle in front within a preset distance on the first lane. In other words, if there is no vehicle in front of and in the same lane as a candidate vehicle within a certain distance of the candidate vehicle, the candidate vehicle is the frontmost vehicle.

Figure 8:
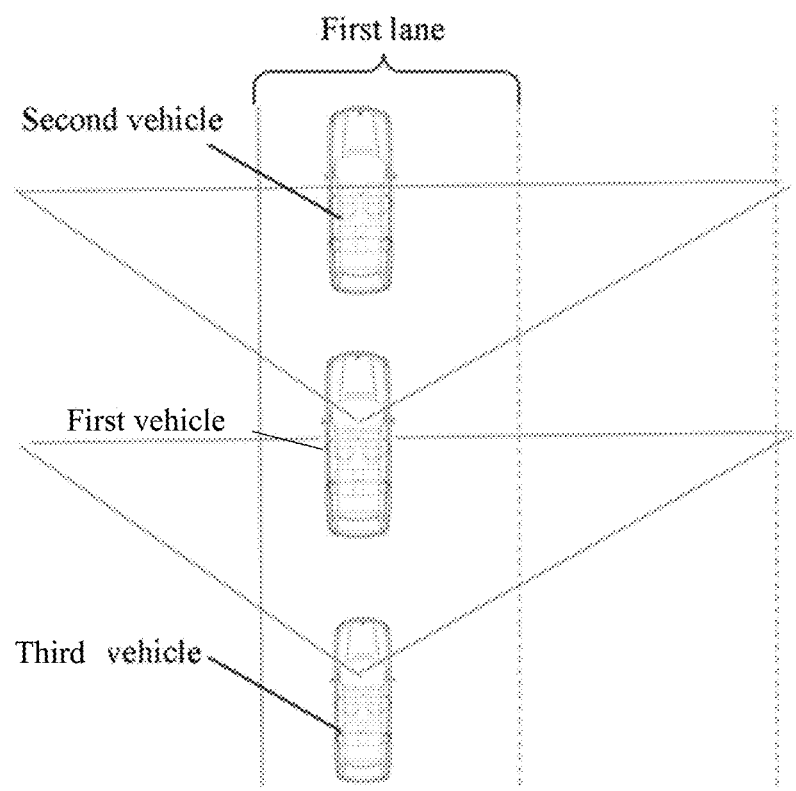
FIG. 8 is a schematic diagram of a first vehicle and a second vehicle according to another embodiment of the present disclosure.

Specifically, a case that there is continuous congestion among a plurality of vehicles is actually caused by slow driving of the frontmost vehicle, as shown in FIG. 8. Therefore, recognizing the frontmost vehicle among a plurality of vehicles traveling on the first lane as the first vehicle and reporting the slow vehicle warning information can alleviate congestion more effectively.

In some embodiments, according to the slow vehicle warning information, a historical congestion event can be backtracked, and the second vehicle can be determined as a frontmost slow vehicle traveling on the same lane as the first vehicle within the preset distance in front of the first vehicle. That is, the historical congestion event can be backtracked according to the slow vehicle warning information, and the second vehicle can be determined as a frontmost vehicle among a plurality of vehicles traveling on the first lane as the first vehicle.

In some embodiments, a map grid identifier corresponding to a location of the second vehicle is searched in a grid map. According to the location of the second vehicle, a link identifier corresponding to the location of the second vehicle is searched in road network information (e.g. through latitude and longitude). At least one of the following information is stored as a congestion event corresponding to the second vehicle in a storage device corresponding to the map grid identifier corresponding to the location of the second vehicle:

time when the slow vehicle warning information is received, the license plate information of the second vehicle, latitude and longitude when a slow speed occurs, the link identifier, and an offset of the location of the second vehicle relative to an end point coordinate in a driving direction in a link corresponding to the link identifier.

Figure 9:
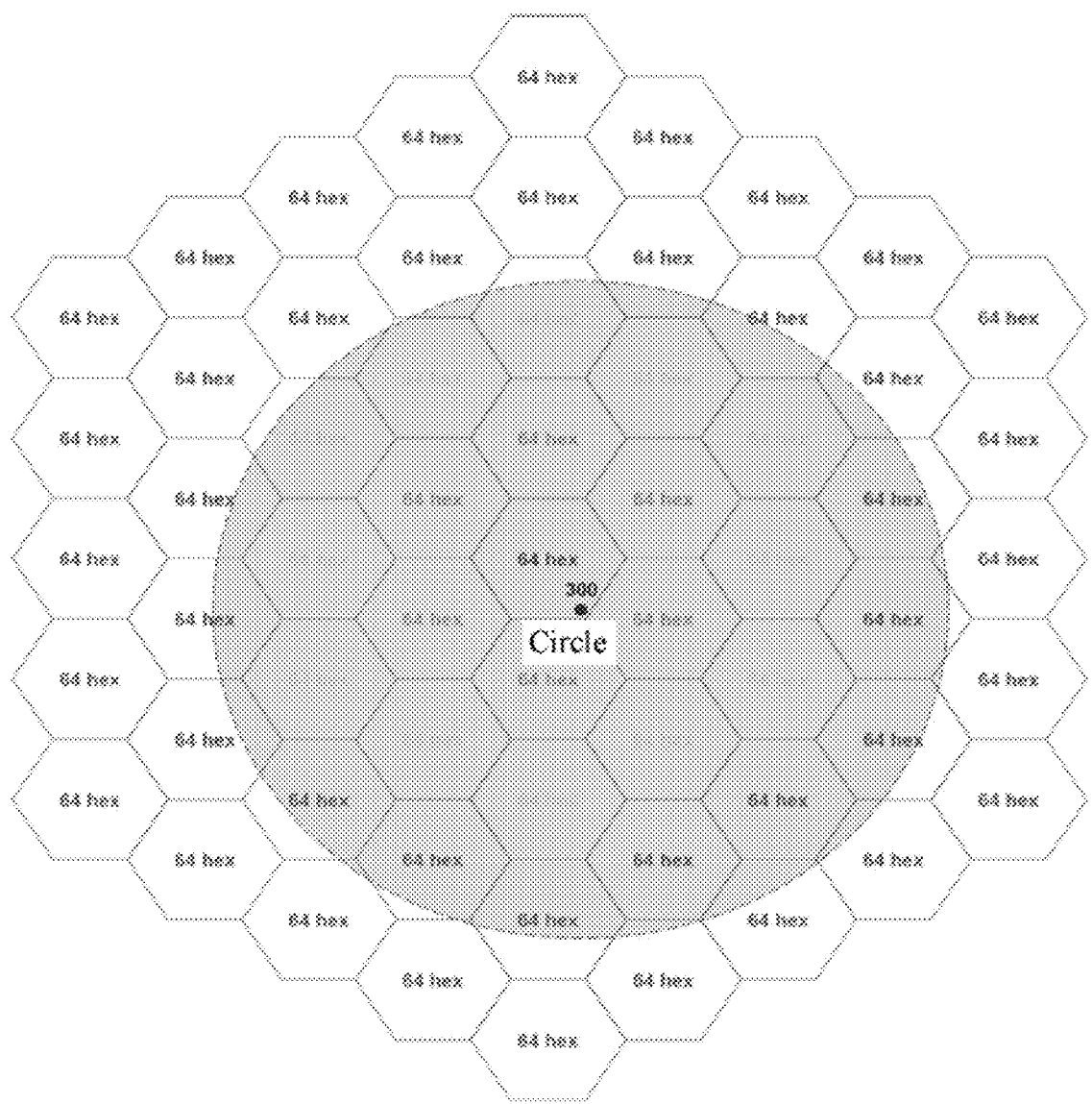
FIG. 9 is a schematic diagram of a grid map according to an embodiment of the present disclosure.

Specifically, the map is gridded. For example, as shown in FIG. 9, the map is divided into hexagons (hex) with a side length of 64 m according to accuracy of 10 levels. Then, for each reported congestion event, a map grid identifier at which a current position X of a slow vehicle is located is first calculated, and then a link identifier at which a current vehicle is located is obtained through longitude and latitude in the road network information. The congestion event (including: reporting time, a license plate number of the slow vehicle, longitude and latitude when slow speed occurs, a link identifier of a position at which the slow speed occurs, and an offset of a current position relative to an end point coordinate of a driving direction of this link) is stored in a storage device corresponding to this specific map grid identifier. An expiration time can be set to 1 minute. Because the vehicle is moving, and the vehicle has traveled far after a certain time, in this case, historical data is invalid, this record can be set to be automatically deleted after 1 minute.

Figure 10:
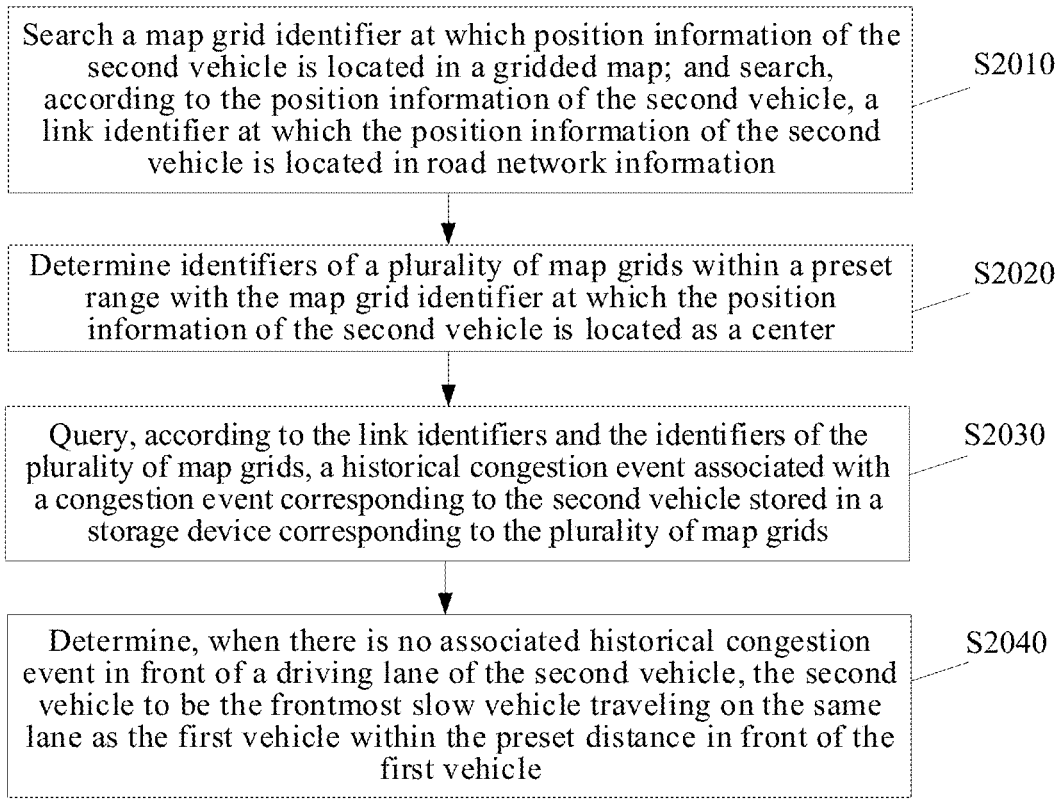
FIG. 10 is a schematic flowchart of a vehicle driving detection method according to another embodiment of the present disclosure.

FIG. 10 is a schematic flowchart of determining the second vehicle as a frontmost slow vehicle traveling on the same lane as the first vehicle within the preset distance in front of the first vehicle according to an embodiment of the present disclosure. The method may be performed by a device having a computational processing capability, for example, by the foregoing in-vehicle terminal 110, or jointly by the foregoing in-vehicle terminal 110 and the server 120. Referring to FIG. 10, it may include at least S2010 to S2040. A detailed description is as follows:

S2010. Search a map grid identifier corresponding to a location of the second vehicle in a grid map; and search, according to the location of the second vehicle, a link identifier corresponding to the location of the second vehicle in road network information (e.g. through latitude and longitude).

Specifically, a uber H3 algorithm may be used for achieving map gridding.

S2020. Determine identifiers of a plurality of map grids within a preset range with the map grid identifier corresponding to the location of the second vehicle as a center.

S2030. Query, according to the link identifiers and the identifiers of the plurality of map grids, a historical congestion event associated with a congestion event corresponding to the second vehicle stored in a storage device corresponding to the plurality of map grids.

In some embodiments, the historical congestion event associated with the congestion event corresponding to the second vehicle includes a historical congestion event associated with the link identifier corresponding to the location of the second vehicle, and/or a historical congestion event associated with another link that can be reached by a link corresponding to the link identifier according to a driving direction in the future.

In some embodiments, when the historical congestion event associated with the link identifier corresponding to the location of the second vehicle stored in the storage device corresponding to the plurality of map grids is queried, an offset of the location of the second vehicle relative to an end point coordinate in a driving direction in a link corresponding to the link identifier is obtained; and a front and rear relationship between the associated historical congestion event and the second vehicle is determined according to the offset.

S2040. Determine, when there is no associated historical congestion event in front of the second vehicle in a driving lane, the second vehicle to be the frontmost slow vehicle traveling on the same lane as the first vehicle within the preset distance in front of the first vehicle.

Therefore, in the embodiments of the present disclosure, by processing the image data corresponding to the driving direction of the first vehicle, whether there is the slow vehicle in front of the first vehicle is detected, and the slow vehicle is warned, so that the slow vehicle can leave the fast lane or speed up in the original lane, thus avoiding an influence of the slow vehicle on a vehicle behind and improving driving experience of the vehicle behind. In addition, it also avoids traffic chaos and even a traffic accident caused by the slow vehicle.

Figure 11:
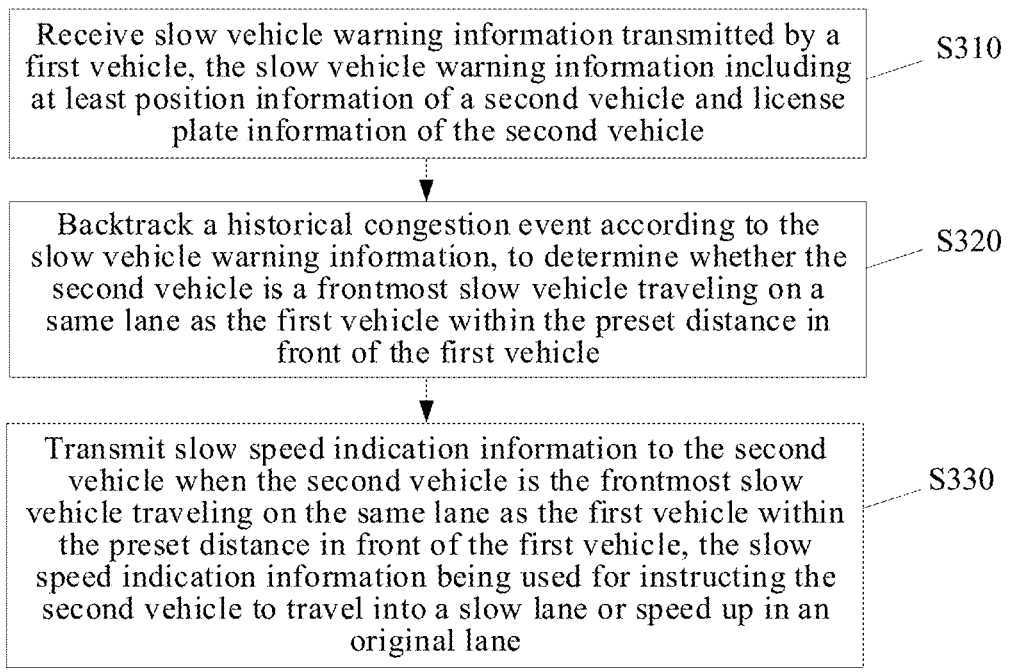
FIG. 11 is a schematic flowchart of a vehicle driving warning method according to another embodiment of the present disclosure.

FIG. 11 is a schematic flowchart of a vehicle driving warning method 300 according to an embodiment of the present disclosure. The vehicle driving warning method 300 may be performed by a device having a computational processing capability, for example, a road monitoring device. The road monitoring device may be the server 120 in FIG. 1 or the road monitoring device may be a device capable of invoking resources of the foregoing server 120. Referring to FIG. 11, the vehicle driving warning method 300 includes at least S310 to S330. A detailed description is as follows:

S310. Receive slow vehicle warning information transmitted by a first vehicle, the slow vehicle warning information including at least position information of a second vehicle and license plate information of the second vehicle.

Specifically, when the first vehicle determines that the second vehicle is a slow vehicle, the first vehicle transmits the slow vehicle warning information. For example, the first vehicle may determine that the second vehicle is the slow vehicle based on a solution in the foregoing slow vehicle warning method 200.

In some embodiments, the slow vehicle warning information may further include speed information of the second vehicle and image data corresponding to a driving direction of the first vehicle.

S320. Backtrack a historical congestion event according to the slow vehicle warning information, to determine whether the second vehicle is a frontmost slow vehicle traveling on a same lane as the first vehicle within the preset distance in front of the first vehicle.

Specifically, after the slow vehicle warning information is received, the historical congestion event is backtracked according to the slow vehicle warning information, to determine whether the second vehicle is the frontmost slow vehicle traveling on the same lane as the first vehicle within the preset distance in front of the first vehicle.

S330. Transmit slow speed indication information to the second vehicle when the second vehicle is the frontmost slow vehicle traveling on the same lane as the first vehicle within the preset distance in front of the first vehicle, the slow speed indication information being used for instructing the second vehicle to travel into a slow lane or speed up in an original lane.

In some embodiments, when the second vehicle is not the frontmost slow vehicle traveling on the same lane as the first vehicle within the preset distance in front of the first vehicle, the slow speed indication information is transmitted to the frontmost slow vehicle traveling on the same lane as the first vehicle, to instruct the vehicle to travel into the slow lane or speed up in the original lane.

Figure 12:
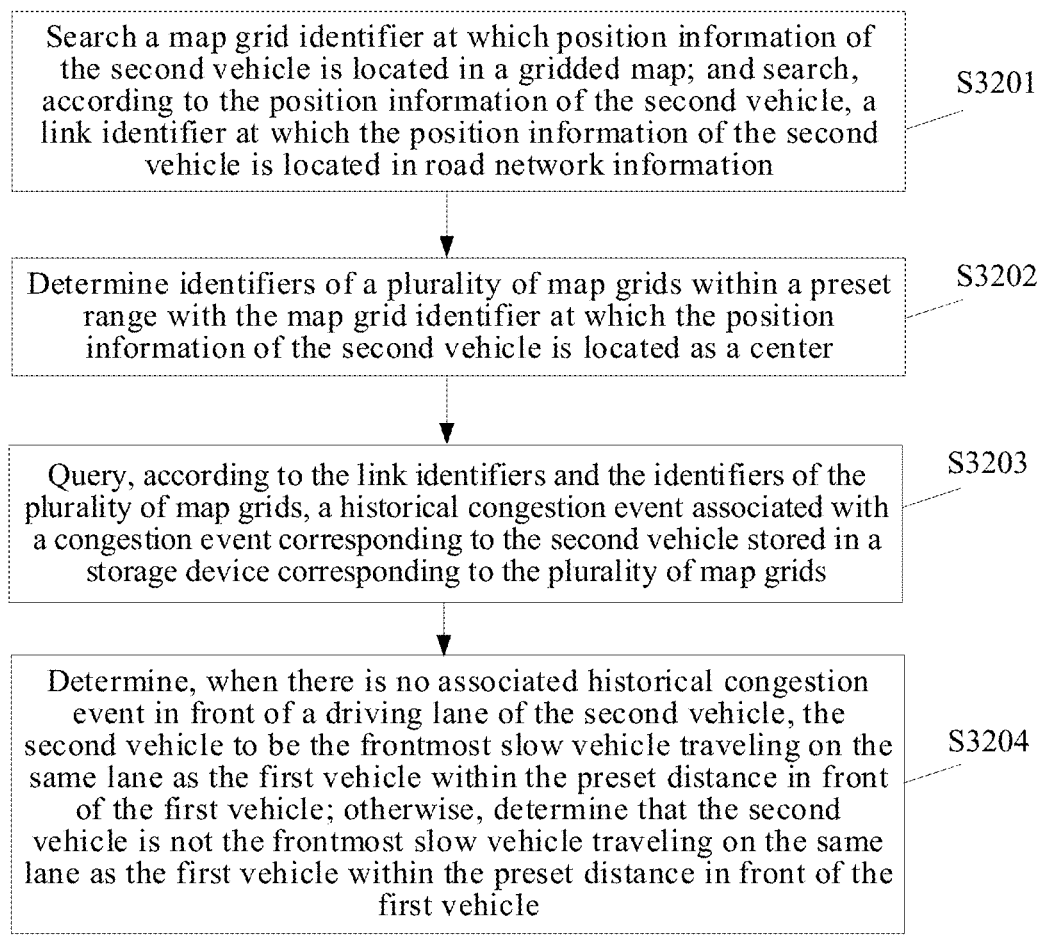
FIG. 12 is a schematic flowchart of a vehicle driving warning method according to another embodiment of the present disclosure.

FIG. 12 is a schematic flowchart of a slow vehicle warning method according to an embodiment of the present disclosure. The method shown in FIG. 12 describes a specific process of the foregoing S320, and may be performed by a device having a computational processing capability, for example, a road monitoring device. The road monitoring device may be the server 120 in FIG. 1 or the road monitoring device may be a device capable of invoking resources of the foregoing server 120. As shown in FIG. 12, the following S3201 to S3204 may be included. Details are as follows:

S3201. Search a map grid identifier corresponding to a location of the second vehicle in a grid map; and search, according to the location of the second vehicle, a link identifier corresponding to the location of the second vehicle in road network information.

Specifically, the link identifier may be searched in the road network information through latitude and longitude, and a uber H3 algorithm may be used for achieving map gridding.

S3202. Determine identifiers of a plurality of map grids within a preset range with the map grid identifier corresponding to the location of the second vehicle as a center.

S3203. Query, according to the link identifiers and the identifiers of the plurality of map grids, a historical congestion event associated with a congestion event corresponding to the second vehicle stored in a storage device corresponding to the plurality of map grids.

S3204. Determine, when there is no associated historical congestion event in front of the second vehicle in a driving lane, the second vehicle to be the frontmost slow vehicle traveling on the same lane as the first vehicle within the preset distance in front of the first vehicle; otherwise, determine that the second vehicle is not the frontmost slow vehicle traveling on the same lane as the first vehicle within the preset distance in front of the first vehicle.

Specifically, after a reported slow vehicle is obtained, it is necessary to determine whether a current vehicle travels slowly because there is a slow vehicle in front of the current vehicle. In this case, map grid identifiers of k circles around a map grid can be quickly calculated through a Krings algorithm of H3, and then all historically reported congestion events in the grid can be queried through the map grid identifiers. k=3 can be used herein, that is, all traffic events within a radius of 400 m around are recalled, and then all events related to a currently reported event are found out with reference to road network data (that is, another link whose link identifier is the same as that of the current event, or another link that can be reached in the future by a current event link identifier according to a driving direction is recalled). If the link identifiers are the same, a front and rear relationship is determined by determining an offset relative to an end point coordinate of a driving direction of the link. If it is found that another related event is on a road ahead of this reported event at the current time, it indicates that the currently reported slow vehicle is not a source of slow driving of a plurality of vehicles, and there is no need to transmit a notice to a driver of the vehicle, otherwise, it is necessary to transmit the notice to the driver of the vehicle, to prompt that a current driving speed is lower than a regulatory requirement, and it is recommended to change a lane or speed up in an original lane.

Figure 13:
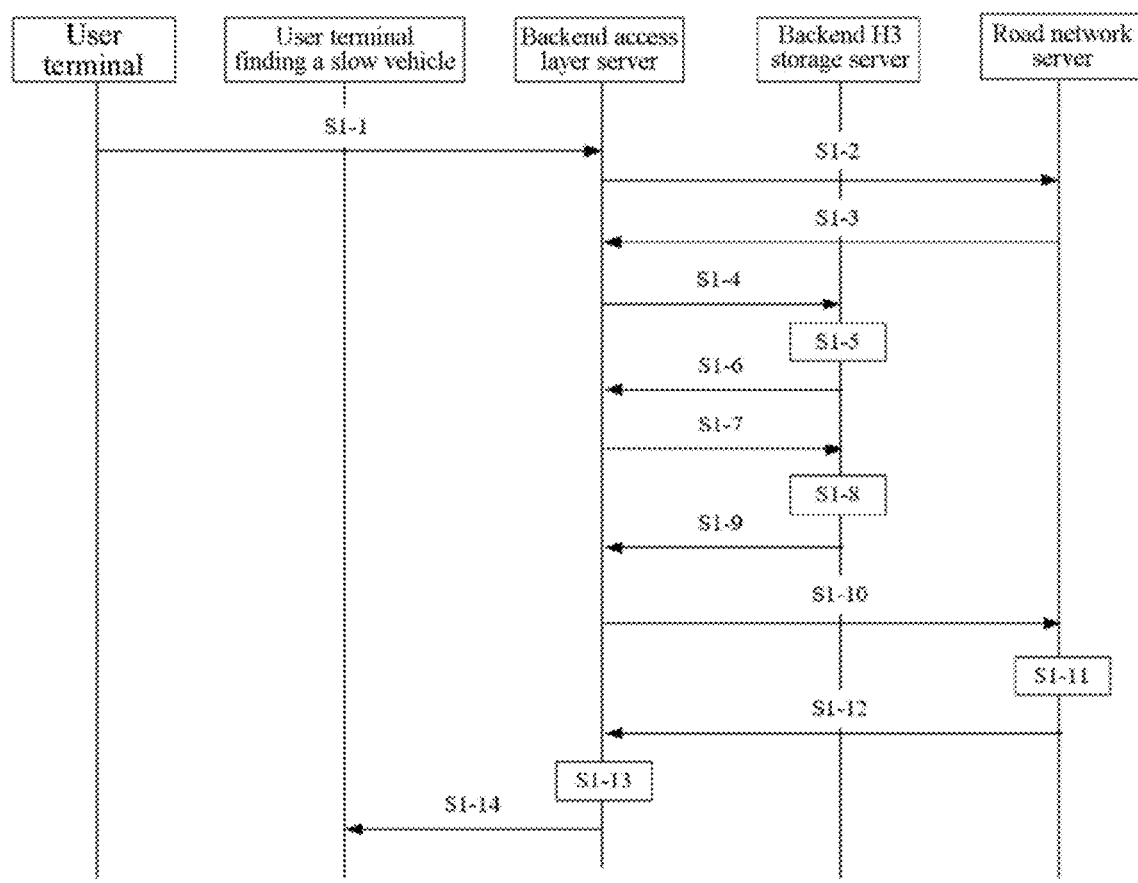
FIG. 13 is a schematic flowchart of a vehicle driving warning method according to another embodiment of the present disclosure.

In some embodiments, a specific flow of the foregoing vehicle driving warning method 300 performed in a road monitoring device may be shown in FIG. 13. As shown in FIG. 13, the road monitoring device may include a backend access layer server, a backend H3 storage server, and a road network server, or the road monitoring device may invoke data of some or all of the backend access layer server, the backend H3 storage server, and the road network server. A user terminal corresponds to an in-vehicle terminal of the first vehicle, and a user terminal found to travel slowly corresponds to an in-vehicle terminal of the second vehicle, which may specifically include S1-1 to S1-14.

S1-1. The user terminal reports a slow traffic event, including a license plate number and position of a target vehicle.

S1-2. After obtaining the slow traffic event, the backend access layer server queries a link identifier of a road at which a position of the target vehicle is located and an offset of the position relative to an end point coordinate in a driving direction in the link from the road network server.

S1-3. The road network server provides feedback of query content to the backend access layer server.

S1-4. The backend access layer server records the slow traffic event to a backend H3 storage server.

S1-5. The backend H3 storage server calculates a map grid identifier at which a reported position is located, stores information corresponding to the slow traffic event in a storage unit corresponding to the map grid identifier, and sets to automatically delete after 1 minute.

S1-6. The backend H3 storage server provides feedback of a map grid identifier corresponding to the slow traffic event to the backend access layer server.

S1-7. The backend access layer server recalls a peripheral slow traffic event from the backend H3 storage server according to the map grid identifier.

S1-8. The backend H3 storage server achieves rapid recall through the Krings algorithm of H3.

S1-9. The backend H3 storage server gives feedback of a recall result to the backend access layer server.

S1-10. The backend access layer server transmits all events to the road network server to determine relevance.

S1-11. The road network server finds out another link whose link identifier is the same as that of a current slow traffic event, or another link that can be reached by a link belonging to the current slow traffic event in the future according to the driving direction, and determines an identifier of another link.

S1-12. The road network server gives feedback whether there is a related event for the current slow traffic event.

S1-13. If no other related events are found, the backend access layer server determines that it is necessary to notify the target vehicle to change a lane or speed up in an original lane.

S1-14. The backend access layer server notifies the target vehicle to change the lane or speed up in the original lane.

Figure 14:
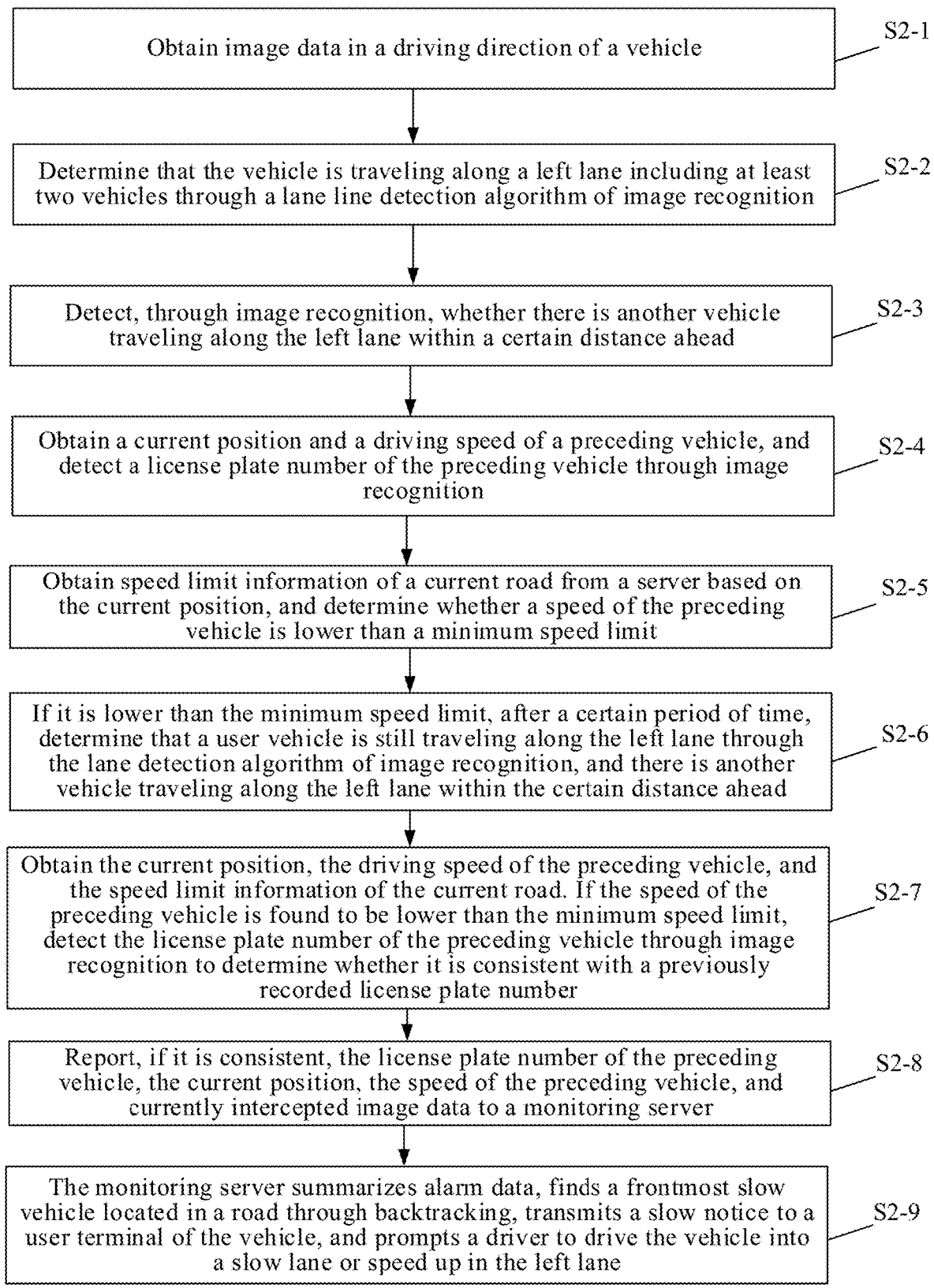
FIG. 14 is a schematic flowchart of a vehicle driving detection and warning according to another embodiment of the present disclosure.

In some embodiments, FIG. 14 is an example of an overall process of a vehicle driving detection and warning according to an embodiment of the present disclosure, which may be performed by a device having a computational processing capability, for example, by the foregoing in-vehicle terminal 110, or jointly by the foregoing in-vehicle terminal 110 and the server 120. As shown in FIG. 14, specifically, the following S2-1 to S2-13 may be included.

S2-1. Obtain image data corresponding to a driving direction of a vehicle.

Specifically, the image data corresponding to the driving direction of the vehicle is obtained from a camera.

The vehicle may be the first vehicle.

For example, a user (such as a passenger) in the first vehicle obtains the image data corresponding to the driving direction of the first vehicle through a camera of a mobile phone.

In another example, a camera of an in-vehicle driving recorder in the first vehicle automatically obtains the image data corresponding to the driving direction of the first vehicle.

S2-2. Determine that the vehicle is traveling along a left lane including at least two vehicles through a lane line detection algorithm of image recognition.

Specifically, image recognition based on the lane line detection algorithm is performed on the obtained image data to determine that the vehicle is traveling along the left lane including at least two vehicles.

S2-3. Detect, through image recognition, whether there is another vehicle traveling along the left lane within a certain distance ahead.

Specifically, image recognition is performed on the obtained image data, to detect whether there is another vehicle traveling along the left lane in the certain distance ahead.

S2-4. Obtain a current position and a driving speed of a preceding vehicle, and detect a license plate number of the preceding vehicle through image recognition.

Specifically, when another vehicle traveling along the left lane is detected in the certain distance ahead, the current position and the driving speed of the preceding vehicle are obtained, and the license plate number of the preceding vehicle is detected through image recognition.

S2-5. Obtain speed limit information of a current road from a server based on the current position, and determine whether a speed of the preceding vehicle is lower than a minimum speed limit.

S2-6. If it is lower than the minimum speed limit, after a certain period of time, determine that a user vehicle is still traveling along the left lane through the lane detection algorithm of image recognition, and there is another vehicle traveling along the left lane within the certain distance ahead.

Specifically, after a certain period of time, the image data corresponding to the driving direction of the vehicle is obtained from the camera, and through the lane detection algorithm of image recognition, it is determined that the user vehicle is still traveling along the left lane including at least two lanes, and there is another vehicle traveling along the left lane within the certain distance ahead.

Specifically, the certain period time may be a preset duration, and the preset duration may be flexibly set according to requirements, for example, the preset duration may be set to 10 s, 20 s, 30 s, 1 minute, and the like. This is not limited in the present disclosure.

S2-7. Obtain the current position, the driving speed of the preceding vehicle, and the speed limit information of the current road. If the speed of the preceding vehicle is found to be lower than the minimum speed limit, detect the license plate number of the preceding vehicle through image recognition to determine whether it is consistent with a previously recorded license plate number.

Specifically, the preceding vehicle may be the second vehicle.

S2-8. Report, if it is consistent, the license plate number of the preceding vehicle, the current position, the speed of the preceding vehicle, and currently intercepted image data to a monitoring server.

Specifically, the monitoring server may be the foregoing road monitoring device.

S2-9. The monitoring server summarizes alarm data, finds a frontmost slow vehicle located in a road through backtracking, transmits a slow notice to a user terminal of the vehicle, and prompts a driver to drive the vehicle into a slow lane or speed up in the left lane. In some embodiments, summarizing alarm data includes gathering data of multiple second vehicles based on image data acquired by multiple first vehicles; identifying nearby second vehicles that are on the same lane and within preset distances of corresponding first vehicles to find the frontmost slow vehicle. For example, four vehicles ABCD are traveling on the same lane in sequence, A being the frontmost vehicle, and BCD are respectively within the present distance of a corresponding vehicle they follow. B can be considered as first vehicle when the server obtains image data from B to determine information about A (A being the second vehicle). B can also be considered as second vehicle when the server obtains image data from C to determine information about B. The server may identify that ABC are all slow vehicles based on data from BCD respectively. Further, by gathering that ABC are all slow and A being the frontmost vehicle, the server can determine that A is the frontmost slow vehicle.

Therefore, a potential accident caused by a driver who violates a minimum speed limit of the left lane due to lingering in the left lane and a right lane.

Therefore, in the embodiments of the present disclosure, by processing the image data corresponding to the driving direction of the first vehicle, whether there is the slow vehicle in front of the first vehicle is detected, and the slow vehicle is warned, so that the slow vehicle can leave the fast lane or speed up in the original lane, thus avoiding an influence of the slow vehicle on a vehicle behind and improving driving experience of the vehicle behind. In addition, it also avoids traffic chaos and even a traffic accident caused by the slow vehicle.

In addition, the embodiments of the present disclosure solve a technical difficulty that user equipment in a vehicle cannot perform slow vehicle recognition. For example, a vehicle monitoring application in a vehicle monitoring system may be used for determining whether another vehicle violates a traffic rule.

Method embodiments of the present disclosure are described above in detail with reference to FIG. 4 and FIG. 14, and apparatus embodiments of the present disclosure are described below in detail with reference to FIG. 15 and FIG. 16. It is to be understood that, the apparatus embodiments and the method embodiments correspond to each other. For similar descriptions, refer to the method embodiments.

Figure 15:
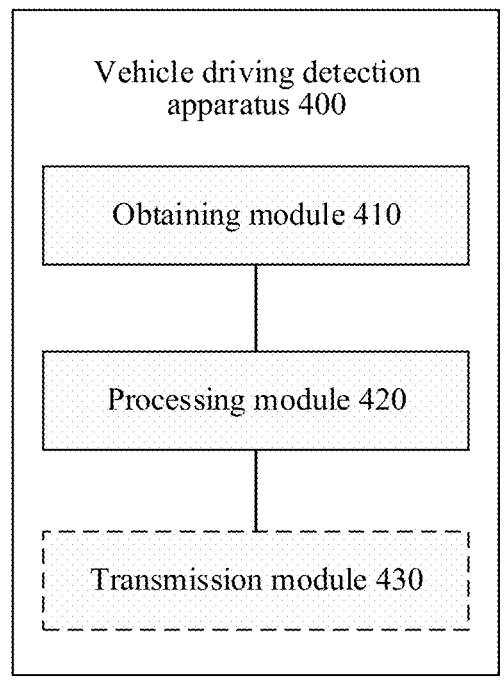
FIG. 15 is a schematic block diagram of a vehicle driving detection apparatus according to an embodiment of the present disclosure.

FIG. 15 is a schematic block diagram of a vehicle driving detection apparatus according to an embodiment of the present disclosure. The vehicle driving detection apparatus may use a software unit or a hardware unit, or a combination of both as part of a computer device. As shown in FIG. 15, a vehicle driving detection apparatus 400 provided in the embodiments of the present disclosure may specifically include:

an obtaining module 410, configured to obtain first image data corresponding to a driving direction of a first vehicle; and a processing module 420, configured to perform lane line detection processing on the first image data to determine that the first vehicle is traveling along a first lane of at least two lanes, perform image recognition processing on the first image data to detect that a second vehicle travels on the first lane within a preset distance in front of the first vehicle, perform speed measurement processing on the second vehicle to obtain a first speed of the second vehicle, and determine, when the first speed is less than a minimum speed limit of the first lane, the second vehicle as a potential slow vehicle.

In an embodiment, the vehicle driving detection apparatus 400 further includes a transmission module 430.

The obtaining module 410 is further configured to re-obtain second image data corresponding to the driving direction of the first vehicle after a preset duration.

The processing module 420 is further configured to perform image recognition processing on the second image data to determine that the second vehicle still travels on the first lane within the preset distance in front of the first vehicle, and re-perform speed measurement processing on the second vehicle to obtain a second speed of the second vehicle.

The transmission module 430 is configured to transmit slow vehicle warning information when the second speed is less than the minimum speed limit of the first lane, the slow vehicle warning information including at least one of current position information of the second vehicle, license plate information of the second vehicle, the second speed, and the second image data.

In an embodiment, the second vehicle is a frontmost vehicle among a plurality of vehicles traveling on the first lane within the preset distance in front of the first vehicle.

In an embodiment, the obtaining module 410 is further configured to obtain the minimum speed limit of the first lane from a road monitoring device or a map server according to current position information of the first vehicle.

In an embodiment, the processing module 420 is further configured to backtrack a historical congestion event according to the slow vehicle warning information, to determine that the second vehicle is a frontmost slow vehicle traveling on a same lane as the first vehicle within the preset distance in front of the first vehicle.

In an embodiment, the processing module 420 is specifically configured to:

search a map grid identifier corresponding to a location of the second vehicle in a grid map;

search, according to the location of the second vehicle, a link identifier corresponding to the location of the second vehicle in road network information;

determine identifiers of a plurality of map grids within a preset range with the map grid identifier corresponding to the location of the second vehicle as a center;

query, according to the link identifiers and the identifiers of the plurality of map grids, a historical congestion event associated with a congestion event corresponding to the second vehicle stored in a storage device corresponding to the plurality of map grids; and determine, when there is no associated historical congestion event in front of the second vehicle in a driving lane, the second vehicle to be the frontmost slow vehicle traveling on the same lane as the first vehicle within the preset distance in front of the first vehicle.

In an embodiment, the historical congestion event associated with the congestion event corresponding to the second vehicle includes: a historical congestion event associated with the link identifier, and/or a historical congestion event associated with another link that can be reached by a link corresponding to the link identifier according to a driving direction in the future.

In an embodiment, the processing module 420 is specifically configured to:

search a map grid identifier corresponding to a location of the second vehicle in a grid map;

search, according to the location of the second vehicle, a link identifier corresponding to the location of the second vehicle in road network information; and store at least one of the following information as a congestion event corresponding to the second vehicle in a storage device corresponding to the map grid identifier corresponding to the location of the second vehicle:

time when the slow vehicle warning information is received, the license plate information of the second vehicle, latitude and longitude when a slow speed occurs, the link identifier, and an offset of the location of the second vehicle relative to an end point coordinate in a driving direction in a link corresponding to the link identifier.

Specific implementation of each module in the vehicle driving detection apparatus 400 provided in the embodiments of the present disclosure may be referred to contents in the foregoing vehicle driving detection method 200 and details are not repeated herein.

Figure 16:
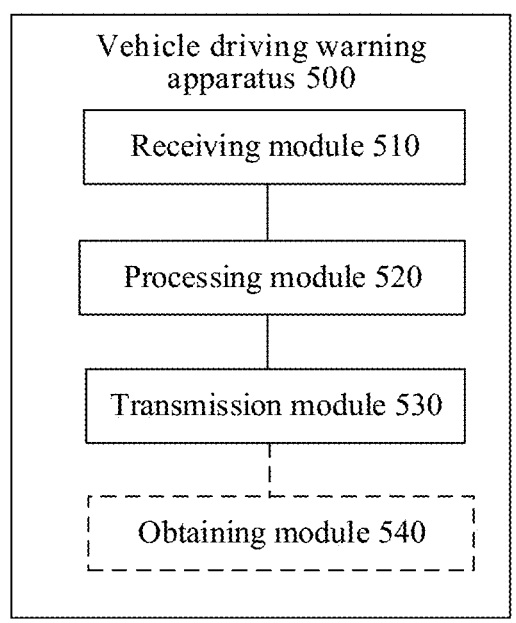
FIG. 16 is a schematic block diagram of a vehicle driving warning apparatus according to another embodiment of the present disclosure.

FIG. 16 is a schematic block diagram of a vehicle driving warning apparatus according to an embodiment of the present disclosure. The vehicle driving warning apparatus may use a software unit or a hardware unit, or a combination of both as part of a computer device. As shown in FIG. 16, a vehicle driving warning apparatus 500 provided in the embodiments of the present disclosure may specifically include:

a receiving module 510, configured to receive slow vehicle warning information transmitted by a first vehicle, the slow vehicle warning information including at least position information of a second vehicle and license plate information of the second vehicle;

a processing module 520, configured to backtrack a historical congestion event according to the slow vehicle warning information, to determine whether the second vehicle is a frontmost slow vehicle traveling on a same lane as the first vehicle within the preset distance in front of the first vehicle; and a transmission module 530, configured to transmit slow speed indication information to the second vehicle when the second vehicle is the frontmost slow vehicle traveling on the same lane as the first vehicle within the preset distance in front of the first vehicle, the slow speed indication information being used for instructing the second vehicle to travel into a slow lane or speed up in an original lane.

In an embodiment, the processing module 520 is specifically configured to:

search a map grid identifier corresponding to a location of the second vehicle in a grid map;

search, according to the location of the second vehicle, a link identifier corresponding to the location of the second vehicle in road network information;

determine identifiers of a plurality of map grids within a preset range with the map grid identifier corresponding to the location of the second vehicle as a center;

query, according to the link identifiers and the identifiers of the plurality of map grids, a historical congestion event associated with a congestion event corresponding to the second vehicle stored in a storage device corresponding to the plurality of map grids; and determine, when there is no associated historical congestion event in front of the second vehicle in a driving lane, the second vehicle to be the frontmost slow vehicle traveling on the same lane as the first vehicle within the preset distance in front of the first vehicle.

In an embodiment, the historical congestion event associated with the congestion event corresponding to the second vehicle includes: a historical congestion event associated with the link identifier, and/or a historical congestion event associated with another link that can be reached by a link corresponding to the link identifier according to a driving direction in the future.

In an embodiment, when the historical congestion event associated with the link identifier corresponding to the location of the second vehicle stored in the storage device corresponding to the plurality of map grids is queried, the vehicle driving warning apparatus 500 further includes an obtaining module 540.

The obtaining module 540 is configured to obtain an offset of the location of the second vehicle relative to an end point coordinate in a driving direction in a link corresponding to the link identifier.

The processing module 520 is further configured to determine, according to the offset, a front and rear relationship between the associated historical congestion event and the second vehicle.

In an embodiment, the processing module 520 is further configured to:

search a map grid identifier corresponding to a location of the second vehicle in a grid map;

search, according to the location of the second vehicle, a link identifier corresponding to the location of the second vehicle in road network information; and store at least one of the following information as a congestion event corresponding to the second vehicle in a storage device corresponding to the map grid identifier corresponding to the location of the second vehicle:

time when the slow vehicle warning information is received, the license plate information of the second vehicle, latitude and longitude when a slow speed occurs, the link identifier, and an offset of the location of the second vehicle relative to an end point coordinate in a driving direction in a link corresponding to the link identifier.

Specific implementation of each module in the vehicle driving warning apparatus 500 provided in the embodiments of the present disclosure may be referred to contents in the foregoing vehicle driving warning method 300 and details are not repeated herein.

All or some of modules in the foregoing vehicle driving warning apparatus may be implemented by using software, hardware, and a combination thereof. The foregoing modules may be built in or independent of a processor of a computer device in a hardware form, or may be stored in a memory of the computer device in a software form, so that the processor invokes and performs an operation corresponding to each of the foregoing modules.

Figure 17:
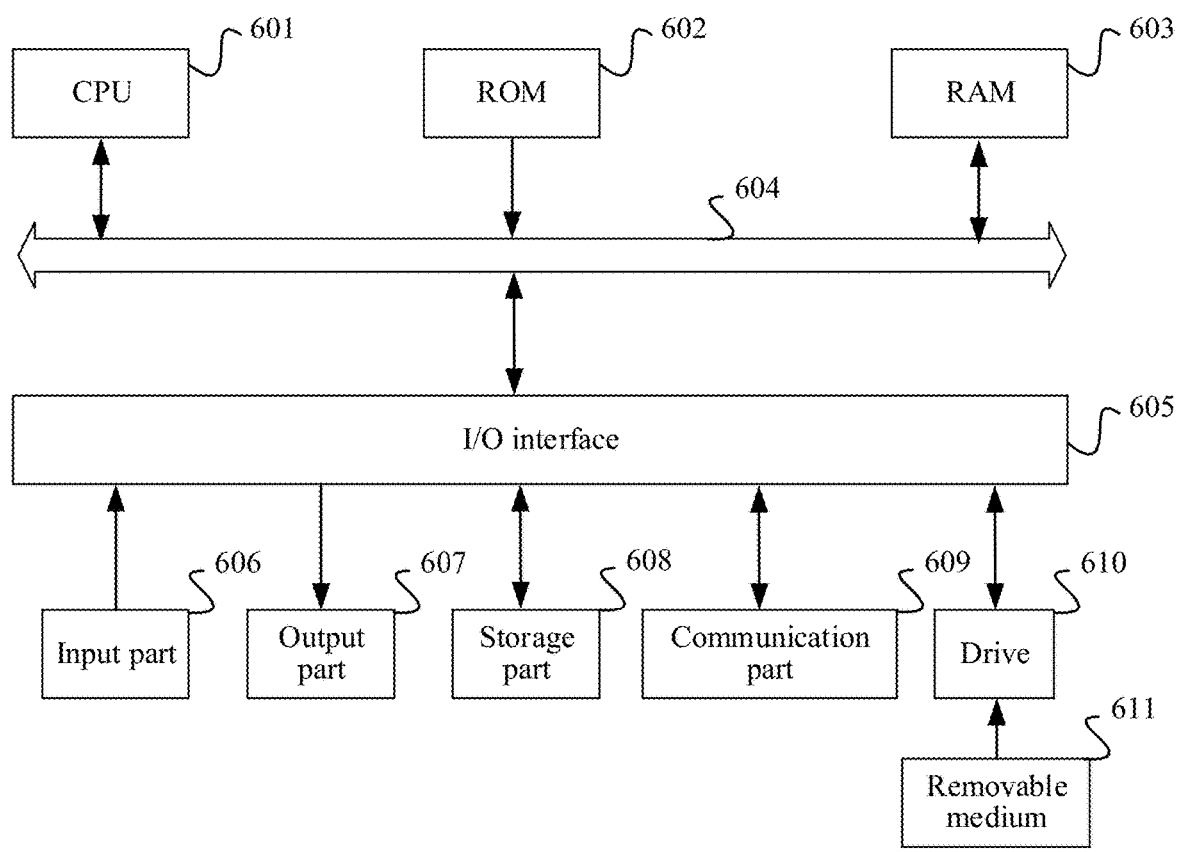
FIG. 17 is a schematic structural diagram of an electronic device adapted to implement the embodiments of the present disclosure.

FIG. 17 is a schematic structural diagram of an electronic device implementing the embodiments of the present disclosure. An electronic device 600 shown in FIG. 17 is merely an example, and does not constitute any limitation to functions and a use range of the embodiments of the present disclosure.

As shown in FIG. 17, the electronic device 600 includes a central processing unit (CPU) 601. The CPU 601 may perform various appropriate actions and processing according to a program stored in a read-only memory (ROM) 602 or a program loaded from a storage portion 608 into a random access memory (RAM) 603. The RAM 603 further stores various programs and data required for operating the system. The CPU 601, the ROM 602, and the RAM 603 are connected to each other through a bus 604. An input/output (I/O) interface 605 is also connected to the bus 604.

The following components are connected to the I/O interface 605: an input part 606 including a keyboard and a mouse, etc.; an output part 607 including a cathode ray tube (CRT), a liquid crystal display (LCD), a speaker, or the like; a storage part 608 including hard disk, or the like; and a communication part 609 including a network interface card such as a local area network (LAN) card, a modem, or the like. The communication part 609 performs communication processing by using a network such as the Internet. A driver 610 is also connected to the I/O interface 605 as required. A removable medium 611, such as a magnetic disk, an optical disc, a magneto-optical disk, or a semiconductor memory, is installed on the driver 610 as required, so that a computer program read from the removable medium is installed into the storage part 608 as required.

Particularly, according to the embodiments of the present disclosure, a process described in the foregoing flowchart may be implemented as a computer software program. For example, an embodiment of the present disclosure includes a computer program product. The computer program product includes a computer program hosted on a computer-readable medium. The computer program includes a program code for performing the method shown in the flowchart. In such an embodiment, the computer program may be downloaded and installed through the communication part 609 from a network, and/or installed from the removable medium 611. When the computer program is executed by the CPU 601, various functions defined in the apparatus of the present disclosure are executed.

In an embodiment, an electronic device is further provided, including:
a processor; and
a memory, configured to store executable instructions of the processor,
the processor being configured to perform operations in the foregoing method embodiments by executing the executable instruction.

An embodiment further provides a computer device, including a memory and a processor, where the memory stores a computer program; and when executing the computer program, the processor performs the steps in the foregoing method embodiments.

In an embodiment, a computer-readable storage medium is provided, storing a computer program. The computer program, when executed by a processor, performs the steps of the foregoing method embodiments.

The computer-readable storage medium in the present disclosure may be, for example, but is not limited to, an electrical, magnetic, optical, electromagnetic, infrared, or semiconductor system, apparatus, or device, or any combination thereof. More specific examples of the computer-readable storage medium may include, but are not limited to: an electrical connection having one or more wires, a portable computer magnetic disk, a hard disk, a random access memory (RAM), a read-only memory (ROM), an erasable programmable read-only memory (EPROM), a flash memory, an optical fiber, a compact disk read-only memory (CD-ROM), an optical storage device, a magnetic storage device, or any appropriate combination thereof. In the present disclosure, the computer-readable storage medium may be any tangible medium containing or storing a program, and the program may be used by or used in combination with an instruction execution system, an apparatus, or a device. In the present disclosure, a computer-readable signal medium may include a data signal being in a baseband or propagated as a part of a carrier wave, the data signal carrying computer-readable program code. A data signal propagated in such a way may assume a plurality of forms, including, but not limited to, an electromagnetic signal, an optical signal, or any appropriate combination thereof. The computer-readable signal medium may further be any computer-readable medium in addition to a computer-readable storage medium. The computer-readable medium may send, propagate, or transmit a program that is used by or used in combination with an instruction execution system, apparatus, or device. The program code included in the computer-readable medium may be transmitted by using any suitable medium, including but not limited to: a wireless medium, a wired medium, an optical cable, radio frequency, or any suitable combination thereof.

This embodiment is merely intended to describe the present disclosure. Selection of a software and hardware platform architecture, a development environment, a development language, a message acquisition source, and the like in this embodiment may be changed. On the basis of the technical solutions of the present disclosure, any improvement and equivalent transformation for a certain part according to a principle of the present disclosure are not to be excluded from the protection scope of the present disclosure.

Terms used in the embodiments of the present disclosure and appended claims are merely intended to describe particular embodiments rather than limit the embodiments of the present disclosure.

Those skilled in the art may be aware that, in combination with the examples described in the embodiments disclosed in this specification, units and algorithm steps may be implemented by electronic hardware or a combination of computer software and electronic hardware. Whether the functions are executed by hardware or software depends on particular applications and design constraint conditions of the technical solutions. A person skilled in the art may use different methods to implement the described functions for each particular application, but it is not to be considered that, the implementation goes beyond the scope of the embodiments of the present disclosure.

When the functions are implemented in a form of a software functional unit and sold or used as an independent product, the functions may be stored in a computer-readable storage medium. Based on such an understanding, the technical solutions of the embodiments of the present disclosure essentially, or the part contributing to the prior art, or part of the technical solutions may be implemented in the form of a software product. The computer software product is stored in a storage medium, and includes several instructions for instructing a computer device (which may be a personal computer, a server, a network device, and the like) to perform all or some of the steps of the method described in the embodiments of the present disclosure. The foregoing storage medium includes: any medium that can store program code, such as a USB flash drive, a removable hard disk, a read-only memory, a random access memory, a magnetic disk, or an optical disc.

It may be clearly understood by a person skilled in the art that, for the purpose of convenient and brief description, for a detailed working process of the foregoing device, apparatus, and unit, refer to a corresponding process in the foregoing method embodiments, and details are not described herein again.

In the several embodiments provided in the present disclosure, it is to be understood that the disclosed electronic device, apparatus, and method may be implemented in other manners.

For example, a division of units, modules, or components in the foregoing apparatus embodiments is merely a division of logic functions, and may use other division manners during actual implementation. For example, a plurality of units, modules, or components may be combined, or may be integrated into another system, or some units, modules, or components may be omitted or skipped.

In another example, the units/modules/components described above as separate/display components may or may not be physically separated, i.e. may be located in one place, or may be distributed over a plurality of network units. Some or all of the units/modules/components can be selected according to actual needs to achieve the objective of the embodiments of the present disclosure.

The foregoing displayed or discussed mutual couplings or direct couplings or communication connections may be implemented by using some interfaces. The indirect couplings or communication connections between the apparatuses or units may be implemented in electric, mechanical, or other forms.

The foregoing content is merely specific implementations of the embodiments of the present disclosure, but are not intended to limit the protection scope of the embodiments of the present disclosure. Any variation or replacement readily figured out by a person skilled in the art within the technical scope disclosed in the embodiments of the present disclosure shall fall within the protection scope of the embodiments of the present disclosure. Therefore, the protection scope of the embodiments of the present disclosure shall be subject to the protection scope of the claims.

What is claimed is:

1. A vehicle driving detection method, performed by an electronic device, and the method comprising:
obtaining first image data corresponding to a driving direction of a first vehicle;
performing lane line detection processing on the first image data to determine that the first vehicle is traveling along a first lane of at least two lanes;
performing image recognition processing on the first image data to detect that a second vehicle travels on the first lane within a preset distance in front of the first vehicle;
performing speed measurement processing on the second vehicle to obtain a first speed of the second vehicle;
determining, when the first speed is less than a minimum speed limit of the first lane, the second vehicle as a potential slow vehicle;
obtaining second image data corresponding to the driving direction of the first vehicle after a preset duration;
performing image recognition processing on the second image data to determine that the second vehicle still travels on the first lane within the preset distance in front of the first vehicle;
re-performing speed measurement processing on the second vehicle to obtain a second speed of the second vehicle;
generating slow vehicle warning information when the second speed is less than the minimum speed limit of the first lane;
backtracking a historical congestion event according to the slow vehicle warning information, to determine that the second vehicle is a frontmost slow vehicle traveling on a same lane as the first vehicle within the preset distance in front of the first vehicle; and
transmitting, by a processor, slow speed indication information to a terminal of the second vehicle when the second vehicle is the frontmost slow vehicle traveling on the same lane as the first vehicle within the preset distance in front of the first vehicle, the slow speed indication information being used for instructing the second vehicle to travel into a slow lane or speed up in an original lane to mitigate an impact of the second vehicle on one or more vehicles behind the second vehicle in the first lane.

2. The method according to claim 1, further comprising:
transmitting the slow vehicle warning information, the slow vehicle warning information comprising at least one of current position information of the second vehicle, license plate information of the second vehicle, the second speed, or the second image data.

3. The method according to claim 2, wherein the second vehicle is a frontmost vehicle among a plurality of vehicles traveling on the first lane, the frontmost vehicle does not have a vehicle in front within the preset distance on the first lane.

4. The method according to claim 2, wherein the backtracking a historical congestion event according to the slow vehicle warning information, to determine that the second vehicle is a frontmost slow vehicle traveling on a same lane as the first vehicle within the preset distance in front of the first vehicle comprises:
searching a map grid identifier corresponding to a location of the second vehicle in a grid map;
searching, according to the location of the second vehicle, a link identifier corresponding to the location of the second vehicle in road network information;
determining identifiers of a plurality of map grids within a preset range with the map grid identifier corresponding to the location of the second vehicle as a center;

querying, according to the link identifiers and the identifiers of the plurality of map grids, a historical congestion event associated with a congestion event corresponding to the second vehicle stored in a storage device corresponding to the plurality of map grids; and determining, when there is no associated historical congestion event in front of the second vehicle in a driving lane, the second vehicle to be the frontmost slow vehicle traveling on the same lane as the first vehicle within the preset distance in front of the first vehicle.

5. The method according to claim 4, wherein the historical congestion event associated with the congestion event corresponding to the second vehicle comprises: a historical congestion event associated with the link identifier, and/or a historical congestion event associated with another link that can be reached by a link corresponding to the link identifier according to a driving direction in the future.

6. The method according to claim 5, wherein when the historical congestion event associated with the link identifier is queried, the method further comprises:
obtaining an offset of the location of the second vehicle relative to an end point coordinate in a driving direction in a link corresponding to the link identifier; and
determining, according to the offset, a front and rear relationship between the associated historical congestion event and the second vehicle.

7. The method according to claim 2, further comprising:
searching a map grid identifier corresponding to a location of the second vehicle in a grid map;
searching, according to the location of the second vehicle, a link identifier corresponding to the location of the second vehicle in road network information; and
storing at least one of the following information as a congestion event corresponding to the second vehicle in a storage device corresponding to the map grid identifier corresponding to the location of the second vehicle:
time when the slow vehicle warning information is received, the license plate information of the second vehicle, latitude and longitude when a slow speed occurs, the link identifier, and an offset of the location of the second vehicle relative to an end point coordinate in a driving direction in a link corresponding to the link identifier.

8. A vehicle driving detection apparatus, comprising:
a processor; and
a memory, configured to store executable instructions of the processor,
the processor being configured, when executing the executable instructions, to perform:
obtaining first image data corresponding to a driving direction of a first vehicle;
performing lane line detection processing on the first image data to determine that the first vehicle is traveling along a first lane of at least two lanes;
performing image recognition processing on the first image data to detect that a second vehicle travels on the first lane within a preset distance in front of the first vehicle;
performing speed measurement processing on the second vehicle to obtain a first speed of the second vehicle;
determining, when the first speed is less than a minimum speed limit of the first lane, the second vehicle as a potential slow vehicle;
obtaining second image data corresponding to the driving direction of the first vehicle after a preset duration;

performing image recognition processing on the second image data to determine that the second vehicle still travels on the first lane within the preset distance in front of the first vehicle;
re-performing speed measurement processing on the second vehicle to obtain a second speed of the second vehicle;
generating slow vehicle warning information when the second speed is less than the minimum speed limit of the first lane;
backtracking a historical congestion event according to the slow vehicle warning information, to determine that the second vehicle is a frontmost slow vehicle traveling on a same lane as the first vehicle within the preset distance in front of the first vehicle; and
transmitting, by the processor, slow speed indication information to a terminal of the second vehicle when the second vehicle is the frontmost slow vehicle traveling on the same lane as the first vehicle within the preset distance in front of the first vehicle, the slow speed indication information being used for instructing the second vehicle to travel into a slow lane or speed up in an original lane to mitigate an impact of the second vehicle on one or more vehicles behind the second vehicle in the first lane.

9. The apparatus according to claim 8, wherein the processor is further configured to perform:
transmitting the slow vehicle warning information, the slow vehicle warning information comprising at least one of current position information of the second vehicle, license plate information of the second vehicle, the second speed, or the second image data.

10. The apparatus according to claim 9, wherein the second vehicle is a frontmost vehicle among a plurality of vehicles traveling on the first lane, the frontmost vehicle does not have a vehicle in front within the preset distance on the first lane.

11. The apparatus according to claim 9, wherein the backtracking a historical congestion event according to the slow vehicle warning information, to determine that the second vehicle is a frontmost slow vehicle traveling on a same lane as the first vehicle within the preset distance in front of the first vehicle comprises:
searching a map grid identifier corresponding to a location of the second vehicle in a grid map;
searching, according to the location of the second vehicle, a link identifier corresponding to the location of the second vehicle in road network information;
determining identifiers of a plurality of map grids within a preset range with the map grid identifier corresponding to the location of the second vehicle as a center;
querying, according to the link identifiers and the identifiers of the plurality of map grids, a historical congestion event associated with a congestion event corresponding to the second vehicle stored in a storage device corresponding to the plurality of map grids; and
determining, when there is no associated historical congestion event in front of the second vehicle in a driving lane, the second vehicle to be the frontmost slow vehicle traveling on the same lane as the first vehicle within the preset distance in front of the first vehicle.

12. The apparatus according to claim 11, wherein the historical congestion event associated with the congestion event corresponding to the second vehicle comprises: a historical congestion event associated with the link identifier, and/or a historical congestion event associated with another link that can be reached by a link corresponding to the link identifier according to a driving direction in the future.

13. The apparatus according to claim 12, wherein when the historical congestion event associated with the link identifier is queried, the processor is further configured to perform:
    obtaining an offset of the location of the second vehicle relative to an end point coordinate in a driving direction in a link corresponding to the link identifier; and
    determining, according to the offset, a front and rear relationship between the associated historical congestion event and the second vehicle.

14. The apparatus according to claim 9, wherein the processor is further configured to perform:
    searching a map grid identifier corresponding to a location of the second vehicle in a grid map;
    searching, according to the location of the second vehicle, a link identifier corresponding to the location of the second vehicle in road network information; and
    storing at least one of the following information as a congestion event corresponding to the second vehicle in a storage device corresponding to the map grid identifier corresponding to the location of the second vehicle:
    time when the slow vehicle warning information is received, the license plate information of the second vehicle, latitude and longitude when a slow speed occurs, the link identifier, and an offset of the location of the second vehicle relative to an end point coordinate in a driving direction in a link corresponding to the link identifier.

15. A non-transitory computer-readable storage medium, storing computer-readable instructions, the computer-readable instructions, when executed by a processor of a computer, causing the processor to implement:
    obtaining first image data corresponding to a driving direction of a first vehicle;
    performing lane line detection processing on the first image data to determine that the first vehicle is traveling along a first lane of at least two lanes;
    performing image recognition processing on the first image data to detect that a second vehicle travels on the first lane within a preset distance in front of the first vehicle;
    performing speed measurement processing on the second vehicle to obtain a first speed of the second vehicle;
    determining, when the first speed is less than a minimum speed limit of the first lane, the second vehicle as a potential slow vehicle;
    obtaining second image data corresponding to the driving direction of the first vehicle after a preset duration;
    performing image recognition processing on the second image data to determine that the second vehicle still travels on the first lane within the preset distance in front of the first vehicle;
    re-performing speed measurement processing on the second vehicle to obtain a second speed of the second vehicle;
    generating slow vehicle warning information when the second speed is less than the minimum speed limit of the first lane;
    backtracking a historical congestion event according to the slow vehicle warning information, to determine that the second vehicle is a frontmost slow vehicle traveling on a same lane as the first vehicle within the preset distance in front of the first vehicle; and
    transmitting, by the processor, slow speed indication information to a terminal of the second vehicle when the second vehicle is the frontmost slow vehicle traveling on the same lane as the first vehicle within the preset distance in front of the first vehicle, the slow speed indication information being used for instructing the second vehicle to travel into a slow lane or speed up in an original lane to mitigate an impact of the second vehicle on one or more vehicles behind the second vehicle in the first lane.

16. The storage medium to claim 15, wherein the computer-readable instructions further cause the processor to implement:
    transmitting the slow vehicle warning information, the slow vehicle warning information comprising at least one of current position information of the second vehicle, license plate information of the second vehicle, the second speed, or the second image data.

* * * * *